(12) United States Patent
Gandhi et al.

(10) Patent No.: US 12,554,543 B1
(45) Date of Patent: Feb. 17, 2026

(54) CONTAINER-BASED PARALLEL COMPUTING SYSTEM

(71) Applicant: Amazon Technologies, Inc., Seattle, WA (US)

(72) Inventors: Mohana Sudhan Gandhi, Bellevue, WA (US); Anirudh Balachandra Aithal, Seattle, WA (US); Jamie Kinney, Seattle, WA (US); Joanne Louise Adegbola, Redmond, WA (US); Rejith George Joseph, Sammamish, WA (US); Brian Barrett, Bellevue, WA (US); Jason Roy Rupard, Renton, WA (US); Aswin Damodar, Seattle, WA (US); Chetan Hosmani, Seattle, WA (US); Ruinan Wang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 475 days.

(21) Appl. No.: 16/401,031

(22) Filed: May 1, 2019

(51) Int. Cl.
*G06F 9/50* (2006.01)
*G06F 9/455* (2018.01)
(Continued)

(52) U.S. Cl.
CPC ........ *G06F 9/5038* (2013.01); *G06F 9/45558* (2013.01); *G06F 9/4881* (2013.01);
(Continued)

(58) Field of Classification Search
CPC .. G06F 9/5038; G06F 9/45558; G06F 9/4881; G06F 9/546; G06F 9/547; G06F 2009/45595
See application file for complete search history.

(56) References Cited

U.S. PATENT DOCUMENTS

| 8,209,702 B1 * | 6/2012 | Roytman | G06F 9/5027 718/106 |
| 8,453,152 B2 * | 5/2013 | Druyan | G06F 9/4881 718/103 |

(Continued)

OTHER PUBLICATIONS

Chang, S., et al. "Evaluating the Suitability of Commercial Clouds for NASA's High Performance Computing Applications: A Trade Study." pp. 1-40 (Year: 2018).*

(Continued)

*Primary Examiner* — Bing Zhao
*Assistant Examiner* — Willy W Huaracha
(74) *Attorney, Agent, or Firm* — Robert C. Kowert; Kowert, Hood, Munyon, Rankin & Goetzel, P.C.

(57) ABSTRACT

A container-based parallel computing system for executing high-performance computing (HPC) applications. The system leverages container technology to package the applications executed at the nodes in a cluster. To load and execute a job in the parallel computing system, containers are deployed in a cluster that include all the application resources and configuration information that the particular HPC application needs to execute. An event-driven batch scheduler may be used to dynamically allocate resources for executing multi-node jobs in the container-based parallel computing system, handling the coordination of resource allocation for the customer. The scheduler insures that jobs begin executing as fast as possible, and handles failure conditions such as partial scaling. Virtual network interfaces are attached to the containers that allow the containers to connect to and communicate with other containers in the cluster directly through the network interfaces of host machines using IP addresses provided by the virtual network interfaces.

20 Claims, 15 Drawing Sheets

(51) Int. Cl.
*G06F 9/48* (2006.01)
*G06F 9/54* (2006.01)
(52) U.S. Cl.
CPC .............. *G06F 9/546* (2013.01); *G06F 9/547* (2013.01); *G06F 2009/45595* (2013.01)

(56) References Cited

U.S. PATENT DOCUMENTS

| | | | | |
|---|---|---|---|---|
| 8,612,590 | B1* | 12/2013 | Chaddha | H04L 63/083 |
| | | | | 709/225 |
| 8,869,164 | B2* | 10/2014 | Bobroff | G06F 9/505 |
| | | | | 718/105 |
| 9,256,467 | B1* | 2/2016 | Singh | G06F 9/5077 |
| 9,531,580 | B1* | 12/2016 | Seaman | H04L 29/08072 |
| 10,069,680 | B1* | 9/2018 | Wylie | H04L 41/40 |
| 11,106,551 | B1* | 8/2021 | Featonby | G06F 11/2023 |
| 11,144,359 | B1* | 10/2021 | Brooker | G06F 21/53 |
| 2001/0047392 | A1* | 11/2001 | Murphy Jr. | H04L 67/1008 |
| | | | | 709/208 |
| 2003/0014467 | A1* | 1/2003 | Hanzawa | G06F 1/3237 |
| | | | | 718/102 |
| 2004/0215780 | A1* | 10/2004 | Kawato | H04L 67/61 |
| | | | | 709/226 |
| 2006/0236368 | A1* | 10/2006 | Raja | G06F 9/5027 |
| | | | | 726/1 |
| 2006/0282838 | A1* | 12/2006 | Gupta | H04L 49/355 |
| | | | | 719/313 |
| 2007/0022425 | A1* | 1/2007 | Jackson | G06F 9/5061 |
| | | | | 718/104 |
| 2007/0255835 | A1* | 11/2007 | Coppinger | G06F 9/505 |
| | | | | 709/226 |
| 2007/0283351 | A1* | 12/2007 | Degenaro | G06F 9/5033 |
| | | | | 718/100 |
| 2008/0098375 | A1* | 4/2008 | Isard | G06F 11/1438 |
| | | | | 717/149 |
| 2009/0193427 | A1* | 7/2009 | Pu | G06F 9/5072 |
| | | | | 718/104 |
| 2009/0320003 | A1* | 12/2009 | Barsness | G06F 8/443 |
| | | | | 717/146 |
| 2012/0198462 | A1* | 8/2012 | Cham | G06F 9/5038 |
| | | | | 718/103 |
| 2013/0007753 | A1* | 1/2013 | Jain | G06F 9/4881 |
| | | | | 718/103 |
| 2016/0219415 | A1* | 7/2016 | Purohit | H04W 4/06 |
| 2016/0321109 | A1* | 11/2016 | He | H04L 67/1008 |
| 2016/0378560 | A1* | 12/2016 | Lu | G06F 9/5066 |
| | | | | 718/104 |
| 2018/0225155 | A1* | 8/2018 | Watt, Jr. | G06F 9/5083 |
| 2019/0050245 | A1* | 2/2019 | Bhageria | G06F 9/5038 |
| 2020/0034062 | A1* | 1/2020 | Gill | G06F 3/0647 |
| 2020/0073692 | A1* | 3/2020 | Rao | G06F 9/45558 |

OTHER PUBLICATIONS

Sanjay, H. A., and Sathish S. Vadhiyar. "A strategy for scheduling tightly coupled parallel applications on clusters." Concurrency and Computation: Practice and Experience 21.18, pp. 2491-2517. (Year: 2009).*
Amazon Web Services, "High Performance Computing on AWS Redefines What is Possible", Retrieved from https://aws.amazon.com/hpc, HPC Market Update, ISC18, 2018, pp. 1-13.
Amazon Web Services, "AWS Batch User Guide", Updated Nov. 19, 2018, pp. 1-105.
Amazon Web Services, "Amazon Elastic Compute Cloud—User Guide for Linux Instances", Updated Apr. 29, 2019, pp. 1-1043.
Amazon Web Services, Amazon Elastic Container Service—Developer Guide', Updated Apr. 2, 2019, pp. 1-626.
Nathan Taber, "Under the Hood: Task Networking for Amazon ECS", Retrieved from https://aws.amazon.com/blogs/compute/under-the-hood-task-networking-for-amazon-ecs/ on May 1, 2019, pp. 1-6.

* cited by examiner

*Receiving, at a network interface of a host machine, outbound messages from a container executing in a container-based virtualization environment on the host machine; the outbound messages include an Internet Protocol (IP) address of the container as a source IP address and IP addresses of other containers in the cluster as destination IP addresses.*
*1500*

*Sending the outbound messages on to the network to be routed to the destination IP addresses.*
*1510*

*Receiving, at the network interface of the host machine, inbound messages for the container from the other containers in the cluster; the inbound messages include the IP address of the container on the host machine as a destination IP address and IP addresses of the other containers in the cluster as source IP addresses.*
*1520*

*Forwarding the inbound messages to the IP address of the container on the host machine.*
*1530*

FIG. 9

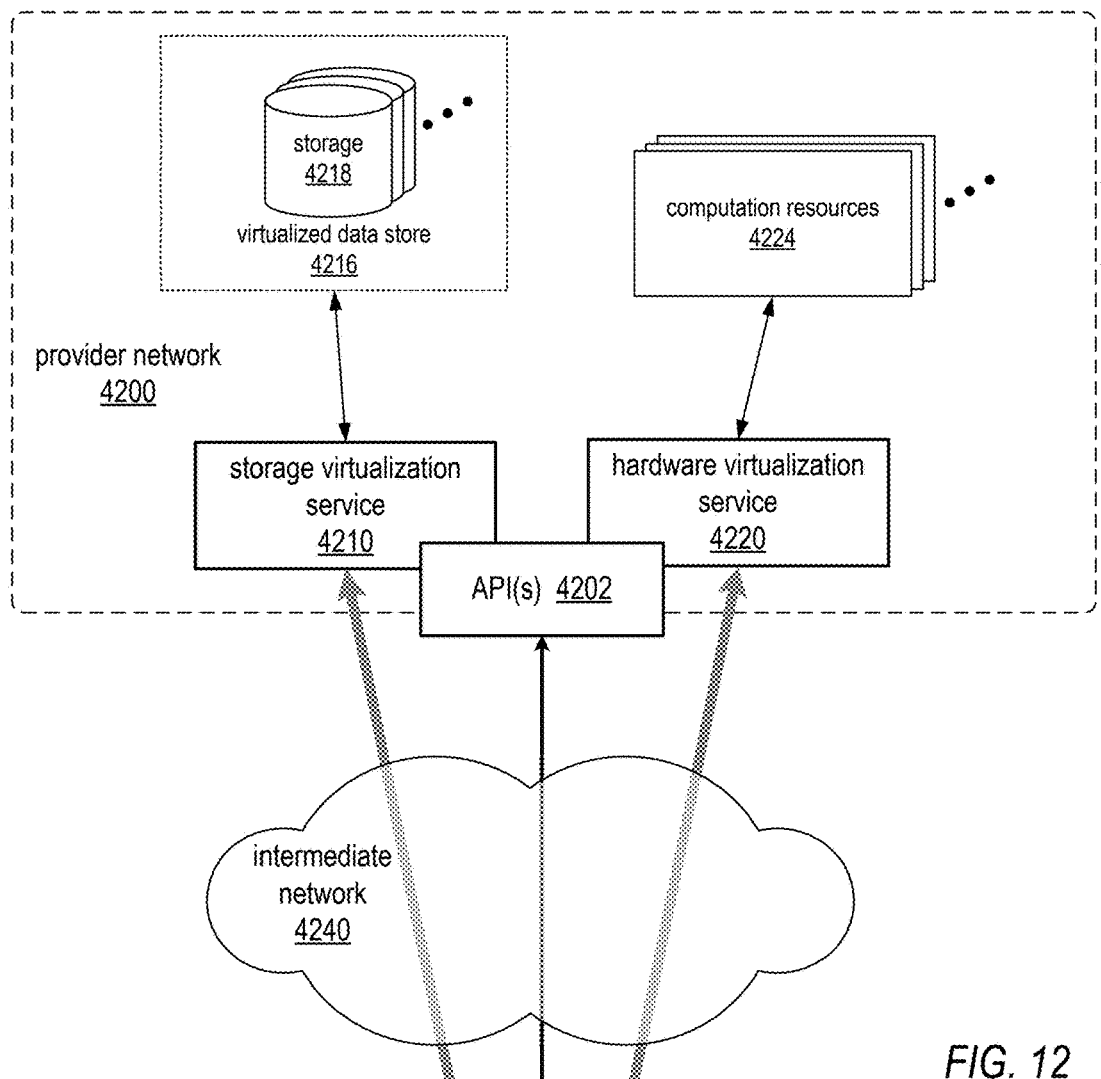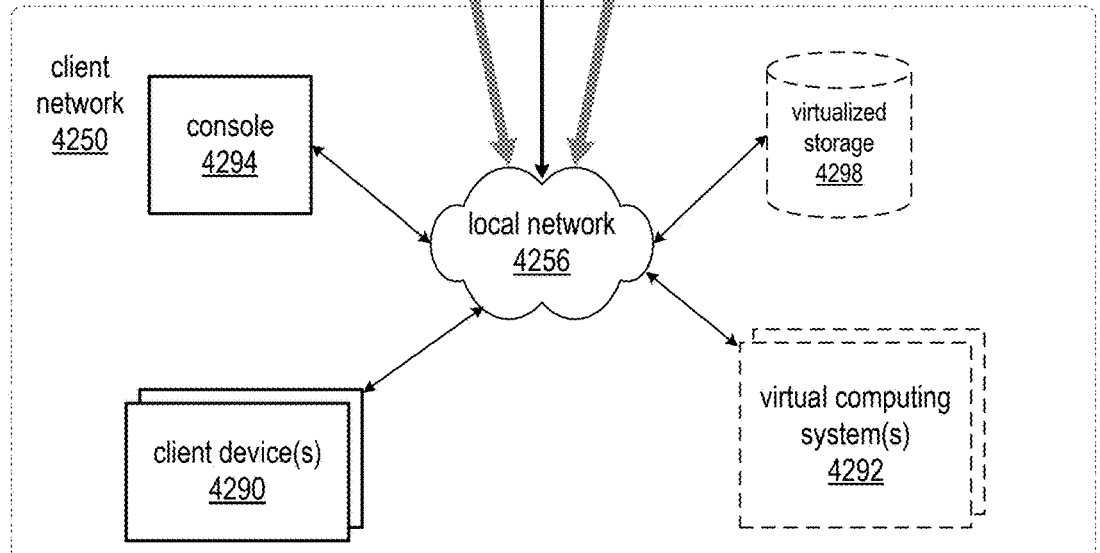
FIG. 12

CONTAINER-BASED PARALLEL COMPUTING SYSTEM

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

BRIEF DESCRIPTION OF THE DRAWINGS

FIG. 9 is a flowchart of a method for processing inbound messages to and outbound messages from a container on a host machine, according to some embodiments.

FIG. 12 is a block diagram of an example provider network that provides a storage virtualization service and a hardware virtualization service to clients, according to some embodiments.

Figure 1A:
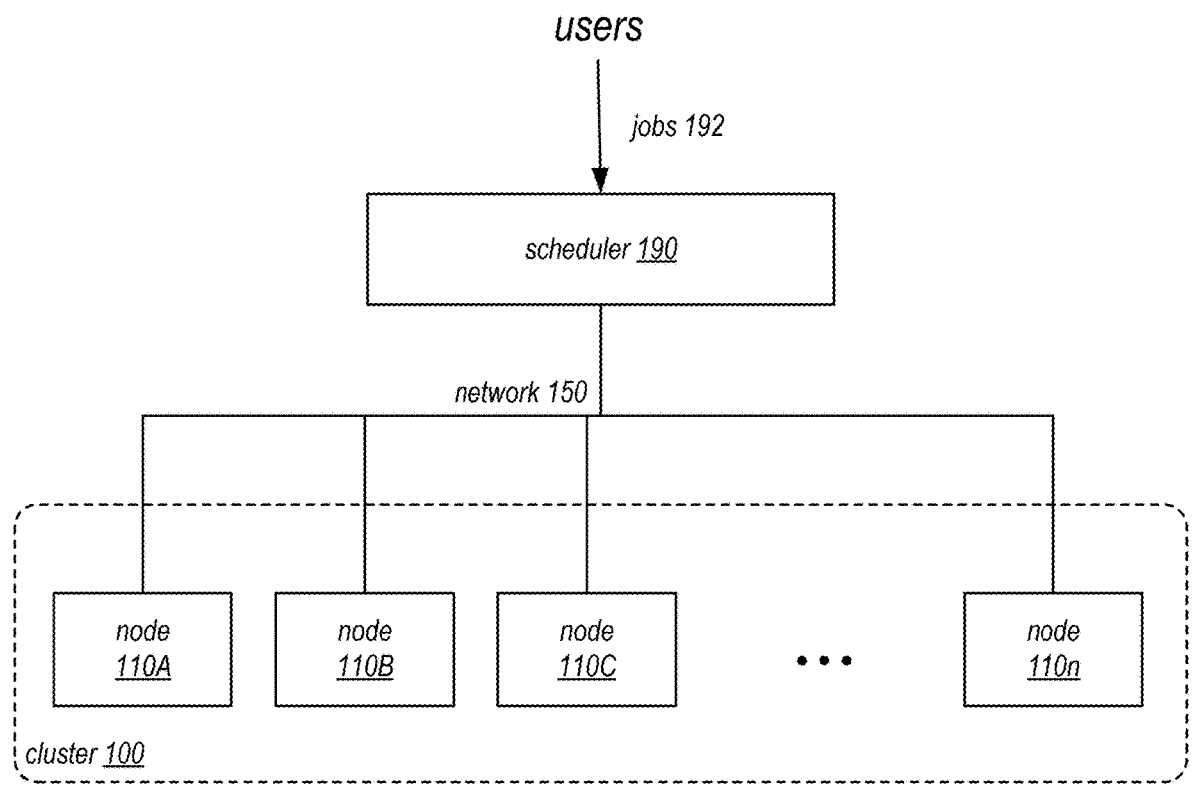
FIG. 1A is a high-level block diagram illustrating a parallel computing architecture including a cluster of nodes that execute high-performance computing (HPC) applications, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of a container-based parallel computing system for scheduling, dynamically provisioning, and executing tightly coupled, network-intensive parallel computing applications such as high-performance computing (HPC) applications in which the nodes communicate using a messaging protocol such as the Message Passing Interface (MPI) protocol) are described that leverage container technology to package the jobs of an HPC application that are executed at the nodes in a cluster. In embodiments, to load and execute a particular HPC application (referred to as a multi-node job) in the parallel computing system, containers are dynamically deployed in a cluster that include all the application resources and configuration information that the particular HPC application needs to execute, and thus the user does not need to configure the nodes for the particular HPC application as in conventional cluster-based parallel computing systems. Embodiments of an event-driven batch scheduler for the container-based parallel computing system are also described. Methods and apparatus for providing low-latency, high-bandwidth networking for the nodes in containerized HPC applications are also described.

Embodiments of the container-based parallel computing system may, for example, be implemented in a provider network. A provider network may, for example, be a network set up by an entity such as a company or a public sector organization to provide one or more services accessible via the Internet (such as various types of cloud-based computing or storage) to a distributed set of clients or customers. A provider network may include one or more data centers hosting various resource pools, such as collections of physical and virtualized computer servers, storage devices, networking equipment and the like, needed to implement and distribute the services offered by the provider. An example provider network in which embodiments may be implemented is illustrated in FIGS. 10 through 13.

Embodiments of an event-driven batch scheduler for a container-based parallel computing system for scheduling, dynamically provisioning, and executing tightly coupled, network-intensive parallel computing applications such as HPC applications in which the nodes communicate using a messaging protocol such as the Message Passing Interface (MPI) protocol) in a provider network are described. A tightly coupled system is a system in which the hardware and software components are linked together and are also dependent upon each other. The nodes of a tightly coupled parallel computing application execute in parallel (i.e., at or near the same time) and may depend on data or results from other nodes. As such, to run the application successfully, the nodes of the multi-node job need to be started as quickly and as near to the same time as possible. In addition, there may be hundreds or thousands of nodes in a multi-node job, the nodes may need to send data to and receive data from other nodes, and communication among the nodes over the network needs to be as fast as possible. Thus, the communication among the nodes is network-intensive, and a communication-intensive parallel messaging protocol such as MPI is used.

In conventional, on-premise clusters for executing HPC applications, the resources (e.g., compute instances) needed to execute a multi-node job are typically pre-allocated. In a cloud-based parallel computing system, the resources (e.g., host machines, virtual machines (VMs), etc.) for executing a multi-node job in the cloud are dynamically allocated. Conventionally, in a cloud-based parallel computing system, customers would be required to coordinate the allocation of cloud-based resources prior to executing their multi-node jobs in the cloud. Embodiments of the event-driven batch scheduler may be used to dynamically allocate resources for executing multi-node jobs in the container-based parallel computing system, handling the coordination of resource allocation for the customer. The event-driven batch scheduler thus provides a much easier method for customers to execute their multi-node jobs in a cloud-based environment, insuring that their tightly coupled multi-node jobs begin executing as fast as possible and appropriately handling failure conditions such as partial scaling.

The event-driven batch scheduler may, for example, be implemented as a service (referred to as a scheduler service) of the provider network that provides an application programming interface (API) and user interface via which users may submit their HPC applications for deployment to and execution as multi-node jobs in the cloud-based computing environment provided by the provider network.

In embodiments of the event-driven batch scheduler, users submit multi-node jobs for execution, for example via an API to the batch scheduler. The multi-node jobs are placed in a job queue of the batch scheduler. The batch scheduler determines when multi-node jobs in the queue can be run in the cloud. Once the batch scheduler has determined that a multi-node job can be run, the batch scheduler starts allocating and scaling up cloud resources (e.g., virtual machines for containers, referred to as container instances) to run the job using an event-driven scheduling method. Scaling up a container instance may, for example, include configuring the container instance with resources (e.g., CPU and memory resources) required for the respective node.

In some embodiments, when allocating cloud resources (e.g., container instances) for a multi-node job, existing resources (e.g., resources that were allocated to previous jobs and that have now been freed) may be reused for the job if available. If one or more resources needed for the job are not available in a pool of free existing resources, the needed resources may be dynamically created. When a multi-node job completes (or fails), its allocated resources may be freed, and may thus be available for allocation to other jobs.

Each node of the multi-node job may be referred to as a "child job". A selected multi-node job is given a job reservation, and each node of the multi-node job is given a child job reservation. Each child job reservation indicates the resources needed to run the respective node. A container instance assigned to a node fulfills its child job reservation. Once all child job reservations are fulfilled, the multi-node job reservation is ready, at which point the multi-node job can be executed.

When container instances become available (either newly allocated instances or freed instances), they join the cluster and generate container instance events. These events are used to dynamically assign the container instances to the nodes of multi-node jobs. There may be many multi-node jobs waiting to execute; the batch scheduler selects a multi-node job, and assigns the container instances to nodes of that job (fulfilling the node reservations). Once assigned to a node of a multi-node job, a container instance cannot be used for any other multi-node job until the container instance is freed upon job completion or failure. Rather than randomly selecting multi-node jobs to assign the container instances to, as container instances become available, the batch scheduler insures that a multi-node job that has some resources already assigned gets priority, and that multi-node job's child nodes get assigned the container instances so that the multi-node job's reservation can be quickly fulfilled and the multi-node job can be quickly started.

By insuring that that the multi-node job that has some resources already assigned gets priority, the event-driven scheduling method avoids conflicts in scheduling and insures that the multi-node job starts quickly. Multiple multi-node jobs may be ready for execution, and the method insures that the multi-node jobs are not assigned container instances randomly, but instead that available resources are allocated to a particular multi-node job so that the nodes of the job can start execution as quickly and as near to the same time as possible.

Embodiments of an event-driven batch scheduler may also provide various failure modes for handling errors in scheduling and resource allocation. A problem in allocating cloud-based resources to multi-node jobs is partial scaling, where some container instances come up and some do not. For example, a particular job reservation may request 100 nodes, and it is possible that only a portion (e.g., 90) of the container instances for those nodes (or the nodes themselves) may be successfully allocated to the multi-node job. There are several stages where failures in resource allocation may occur. For example, a container instance may come up but not bootstrap. As another example, a container instance might have network or permission issues. As other examples, a container instance might have a transient error, or the container instance may fail to join the cluster.

The event-driven batch scheduler provides failure modes to deal with partial scaling, both to minimize partial scaling and, in the event that it does happen, to appropriately address the problem by taking steps to fulfill the resource requirements of the job reservation, cancelling the multi-node job, rescheduling the multi-node job, and/or requesting an action by the customer to address the partial scaling failure for the job; the particular actions taken may be based on the reason for the partial scaling failure.

The failure modes provided by the batch scheduler may help to insure that the customers' experience of running multi-node jobs in the cloud do not result in wasted resources or time spent on not running their jobs. The batch scheduler may inform the customers that their jobs cannot be run, indicate the reasons that the jobs cannot be run, and in some cases (depending on the reasons for failure) may leave a failed multi-node job in the queue to run the job when resources become available.

In addition, embodiments of a container-based parallel computing system for executing HPC applications are described in which virtual network interfaces may be attached to the containers in a cluster that allow the containers to connect to and communicate with other containers in the cluster (including containers on the same host machine and containers on different host machines) directly through the network interfaces of the host machines using Internet Protocol (IP) addresses provided by the virtual network interfaces. Thus, communications between the containers in the cluster (e.g., using a messaging protocol such as the Message Passing Interface (MPI) protocol) bypass the added networking layer of the container platform and avoid latency and bandwidth restrictions that may be imposed by the container platform.

HPC applications executing on clusters of nodes may rely on host files to facilitate communications among the nodes. Broadly defined, a host file is a file (e.g. a plain text file) that maps host names (i.e., nodes in the cluster) to IP addresses. The host file may be distributed to one or more nodes in the cluster so that jobs executing on the nodes can identify other nodes in the cluster with which they need to communicate. In a conventional, on-premise cluster for executing HPC applications, since the nodes in the cluster are pre-allocated, the IP addresses of the nodes in the cluster are known and the host file for the cluster can be pre-defined and distributed to the nodes in the cluster prior to executing multi-node jobs in the cluster. In the container-based parallel computing system for executing HPC applications, the cluster of nodes for executing a multi-node job in the cloud is dynamically generated, and thus the host file for the cluster cannot be pre-defined as the IP addresses of the nodes in the cluster are not known in advance. Thus, a host file may need to be dynamically generated for the cluster as the cluster is being generated. In some embodiments, to dynamically generate a host file for a cluster for executing a multi-node job, the batch scheduler starts a first node (referred to as the main node), and thus obtains the IP address of the main node. The batch scheduler then starts the other nodes (referred to as child nodes) with the main node's IP address included in the child nodes' environment variables. As the child nodes come up, the nodes already have the main node's IP address so they can connect to the main node and provide their IP addresses to the main node. A process on the main node may thus dynamically create a host file from the IP addresses provided by the child nodes. The child nodes can then communicate with the main node to obtain IP addresses of other nodes in the cluster as needed. Alternatively, the host file may be distributed to one or more of the child nodes in the cluster.

FIG. 1A is a high-level block diagram illustrating a parallel computing architecture including a cluster of nodes that execute high-performance computing (HPC) applications, according to some embodiments. HPC applications execute on clusters 100 of compute nodes 110 that provide a parallel computing architecture for processing large data sets, for example data sets for scientific applications. The compute nodes 110 may, for example, be implemented as virtual machines (VMs) on host devices in network 150. Multiple nodes 110 in a cluster 100 may be configured to execute the same application on a large data set in parallel. Execution binaries, libraries, and data used by the HPC applications may be directly available to the applications or indirectly available on external storage. The nodes 110 in the cluster 100 may communicate via a network 150, for example using a messaging protocol such as MPI, and typically require low-latency, high-bandwidth communications over the network 150. Message Passing Interface (MPI) is a standardized and portable message-passing standard that is designed to function on a wide variety of parallel computing architectures.

In a cluster-based parallel computing system for executing HPC applications as illustrated in FIG. 1A, the cluster 100 resources on network 150 may be shared among multiple users. In addition, a particular user may have multiple HPC applications that the user wants to execute on the cluster-based parallel computing system. A batch scheduler 190 may be provided via which users may submit jobs 192 for their HPC applications. However, different HPC applications may require different environmental configurations (e.g., different execution binaries, libraries, data, settings, etc.) for the nodes 110 in a cluster 100. Conventionally, users submit jobs 192 that dynamically reconfigure the nodes in a cluster 100 to load and execute their particular HPC applications on the cluster 100. This requires the users to manage the environmental configurations for multiple jobs 192 so that the nodes 110 in the cluster 100 can be dynamically reconfigured to execute their particular HPC applications correctly.

Figure 1B:
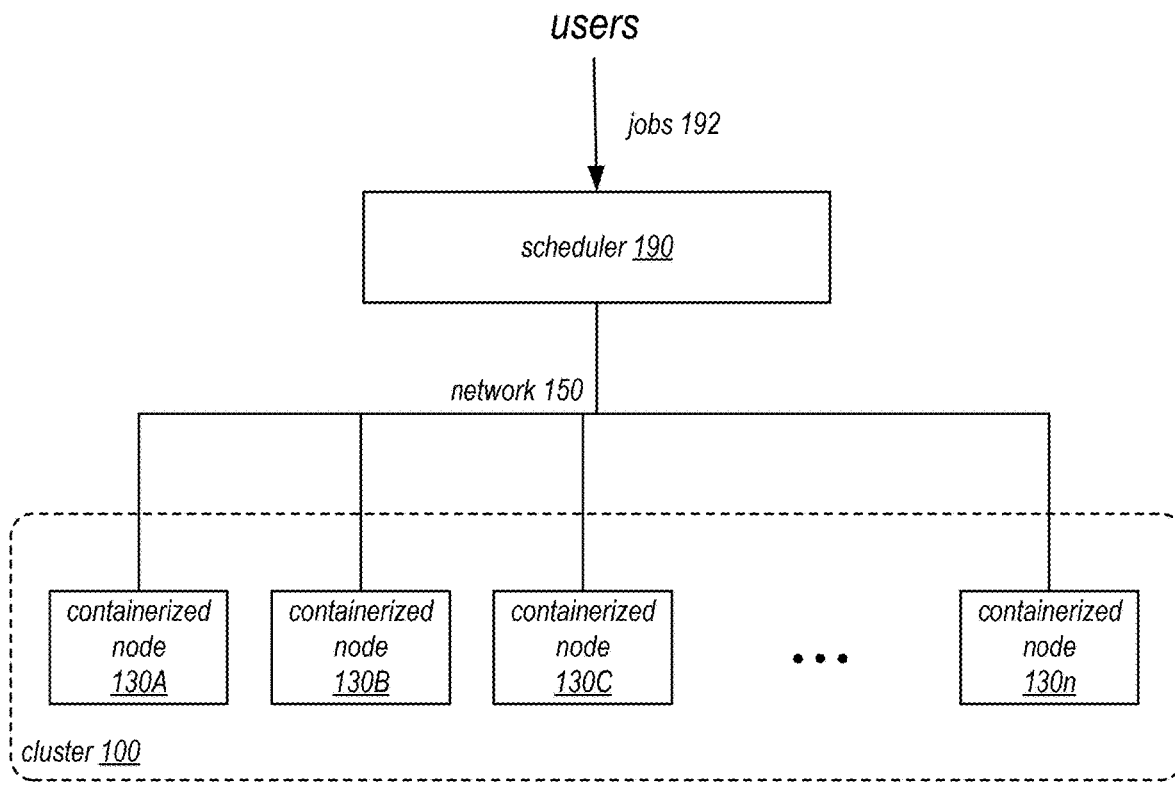
FIG. 1B is a high-level block diagram illustrating a containerized HPC application, according to some embodiments.

FIG. 1B is a high-level block diagram illustrating a containerized HPC application, according to some embodiments. Embodiments of a container-based parallel computing system for executing HPC applications are described that leverage container technology to package the applications executed at the nodes in a cluster 100. Container technology is a virtualization technology that allows applications to be developed as containers that can be deployed to and executed in container-based virtualization environments provided by container platforms on host machines, for example host devices in a provider network as illustrated in FIGS. 10 through 13. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple workloads (containers) to run on a single OS instance. An example container platform that may be used in embodiments is the Docker container platform. Note, however, that other container platforms may be used in embodiments.

Thus, in embodiments, to load and execute a particular job 192 in the parallel computing system, the nodes of the job 192 are deployed as containers (containerized nodes 130) in a cluster 100 that include all the application resources and configuration information that the particular HPC application needs to execute, and thus the user does not need to dynamically reconfigure the nodes in the cluster for the particular HPC application as in conventional cluster-based parallel computing systems. Instead, the user defines containers for the nodes of particular HPC applications and submits jobs 192 to the scheduler 190 for the applications. The submitted jobs 192 indicate the respective containers for the cluster 100 and thus do not have to define all of the environmental variables for each node.

Batch Scheduler for Container-Based Parallel Computing Systems

Embodiments of an event-driven batch scheduler for a container-based parallel computing system for scheduling and executing tightly coupled, network-intensive HPC applications in a provider network are described. Embodiments of the event-driven batch scheduler enable customers to execute parallel batch workloads that require communication between individual tasks (nodes) in the cloud.

Embodiments of the event-driven batch scheduler may be used to dynamically allocate resources for executing multi-node jobs in the container-based parallel computing system described herein, handling the coordinating of resource allocation for the customer.

Figure 2:
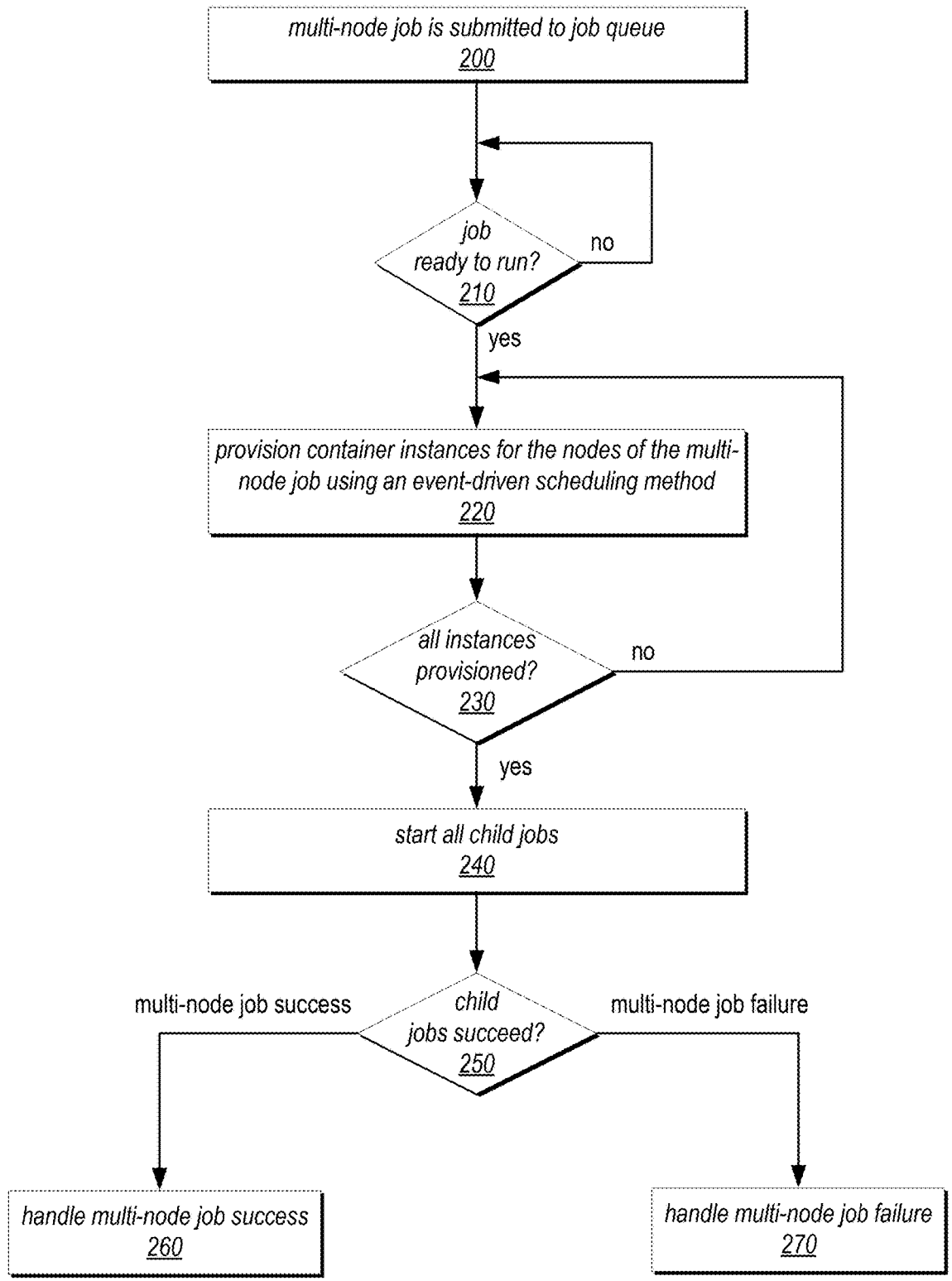
FIG. 2 is a high-level flowchart of a method of operation for an event-driven batch scheduler, according to some embodiments.

FIG. 2 is a high-level flowchart of a method of operation for an event-driven batch scheduler, according to some embodiments. At 200, a multi-node job is submitted to the batch scheduler. In embodiments of the event-driven batch scheduler, users submit multi-node jobs for execution, for example via an API to the batch scheduler. The multi-node jobs are placed in a job queue of the batch scheduler. At 210, the batch scheduler determines when multi-node jobs in the queue can be run in the cloud. At 220, once the batch scheduler has determined that a multi-node job can be run, the scheduler starts provisioning cloud resources (e.g., virtual machines for containers, referred to as container instances) to run the job using an event-driven scheduling method.

In some embodiments, when allocating cloud resources (e.g., container instances) for a multi-node job, existing resources (e.g., resources that were allocated to previous jobs and that have now been freed) may be reused for the job if available. If one or more resources needed for the job are not available, the needed resources may be dynamically created. When a multi-node job completes (or fails), its allocated resources may be freed, and may thus be available for allocation to other jobs.

Each node of the multi-node job may be referred to as a "child job". A selected multi-node job is given a job reservation, and each child node is given a child job reservation. Each child job reservation indicates the resources needed to run the respective node. A container instance assigned to a node fulfills its child job reservation. At 230, once all child job reservations are fulfilled, the multi-node job reservation is ready, at which point the multi-node job can be executed. At 240, the batch scheduler starts all child jobs to run the multi-node job. At 250, if the child jobs succeed, then the multi-node job has succeeded. At 260, the event scheduler handles success of the multi-node job. For example, all the child jobs are terminated and the respective resources (e.g., container instances) are released. At 250, if one or more child jobs fail, then the multi-node job has failed. At 260, the event scheduler handles failure of the multi-node job. For example, in some embodiments, the failed job may be retried at least once, and if not successful any resources allocated to the job may be freed. The elements of FIG. 2 are explained in further detail below.

When container instances become available (either newly allocated instances or freed instances), they join the cluster and generates a container instance event. These events are used to dynamically assign the container instances to the nodes of multi-node jobs. There may be many multi-node jobs waiting to execute; the batch scheduler selects a multi-node job, and assigns the container instance to a node of that job (fulfilling its reservation). Once assigned, that container instance cannot be used for any other multi-node job until the container instance is freed upon job completion or failure.

Rather than randomly selecting multi-node jobs to assign the container instances to, as container instances become available, the batch scheduler insures that a multi-node job that has some resources already assigned gets priority, and that multi-node job's child nodes get assigned the container instances so that the multi-node job's reservation can be quickly fulfilled and the multi-node job can be quickly started. By insuring that that the multi-node job that has some resources already assigned gets priority, the event-driven scheduling method avoids conflicts in scheduling and insures that the multi-node job starts quickly. Multiple multi-node jobs may be ready for execution, and the method insures that the multi-node jobs are not assigned container instances randomly, but instead that available resources are allocated to a particular multi-node job so that the job can start execution more quickly.

At a high level, a tightly coupled multi-node job can be viewed as an array of child jobs where the child jobs can have heterogeneous properties, all child nodes jobs need to be executed at the same time for the job to succeed, and the child nodes need to be explicitly terminated after the main job exits. Internally, the batch scheduler splits a multi-node job into individual batch ("child") jobs and schedules each child job in a reserved container instance. The individual nodes of the multi-node job may be made visible to the customer via an API and user interface to the batch scheduler.

In some embodiments, the batch scheduler may include requirements for a multi-node job in a namespace report. In some embodiments, the namespace report may be compressed using histograms that group by CPU, memory, and an additional dimension representing the heterogeneity of the multi-node job. For example, if a multi-node job has five different types of node properties, then five entries will be found in the namespace report.

A master controller receives the namespace report and sends it to a resource provisioning process for scheduling and scaling calculations. The resource provisioning process allocates or assigns resources (e.g., container instances) for the multi-node job only if the complete multi-node job can be fit into a compute environment. This ensures that deadlocks do not happen where multiple multi-node jobs start holding on to resources and none of them can be fulfilled completely due to resource (e.g., CPU and memory) limits defined in the compute environment.

In some embodiments, the resource requirements for a multi-node job are converted into a job reservation that includes reservations for each node of the multi-node job. The job reservation is stored, for example in a distributed database table. If there are available resources (e.g., container instances) that can fulfill the reservations then they are assigned to the reservations; if not, the reservations are forwarded to a resource provisioning service for fulfillment. The resource provisioning service starts a workflow to fulfill the reservations in which the service locates and provisions container instances for the reservations; each fulfilled reservation generates an event. Each container instance provisioned for the job reservation is given a unique identifier; the identifier for a container instance that is provisioned to fulfill a reservation is included in the event message and recorded in the respective job reservation entry by the batch scheduler in response to the respective event generated for the fulfilled reservation by the resource provisioning service.

The batch scheduler receives events for each reservation arriving and updates the job reservation table; once all reservations have arrived, the batch scheduler fetches all reservations and begins starting each node associated with the multi-node job. In a multi-node job, one node is designated as a main node, and the other nodes are designated as child nodes. In some embodiments, the batch scheduler first starts the main node, and then starts the child nodes. The batch scheduler includes the main node's IP address in the child node's environment variables. As the child nodes come up, the child nodes provide their IP addresses to the main node. A process on the main node may thus dynamically create a host file from the IP addresses provided by the child nodes. The child nodes can then communicate with the main node to obtain IP addresses of other nodes in the cluster as needed. Alternatively, the host file may be distributed to one or more of the child nodes in the cluster.

In some embodiments, when calling start task for a node, the batch scheduler adds a placement constraint that restricts the job to a specific container instance specified in the respective job reservation entry. In some embodiments, the container instance is tagged with an identifier that prevents other jobs from being run in a container instance provisioned or attached to a node in a multi-node job.

Once all the tasks for a multi-node job are started, the batch scheduler moves the customer-visible multi-node job to a running state. Information about the nodes, for example the container instances that the nodes are running on, the network interfaces attached to the nodes, etc., is added to node job entries and made available to the customer via an API to the batch scheduler.

Once the main node terminates, the batch scheduler terminates the other nodes associated with the job. The main multi-node job status and exit code are set from the main node. When each of the nodes goes into a terminal state, the batch scheduler updates the reservation for the node so that the node's resources are freed to be used by other jobs.

Figure 3:
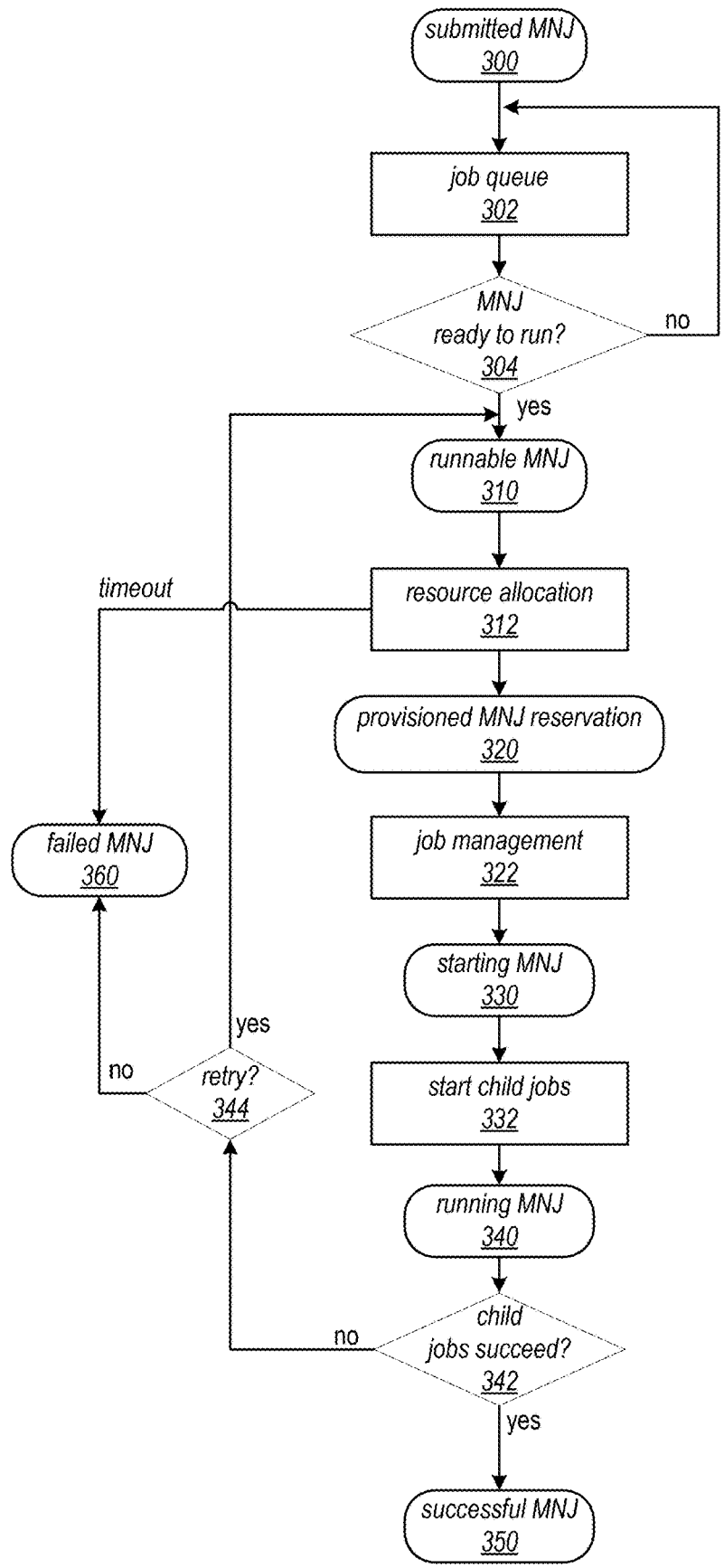
FIG. 3 shows a high-level overview of the event-driven scheduling method, according to some embodiments.
Figure 4:
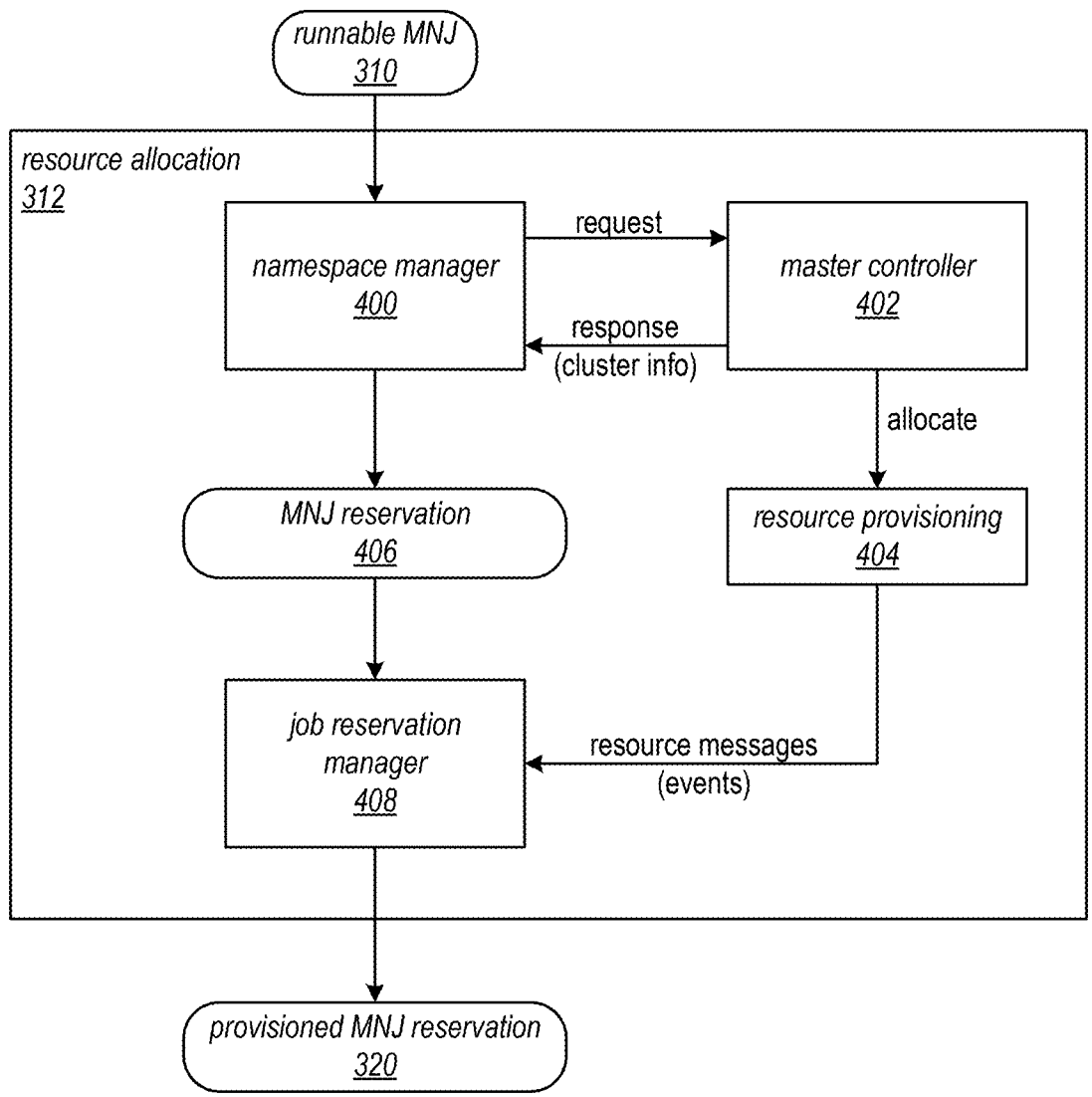
FIG. 4 shows the resource allocation process in more detail, according to some embodiments.
Figure 5:
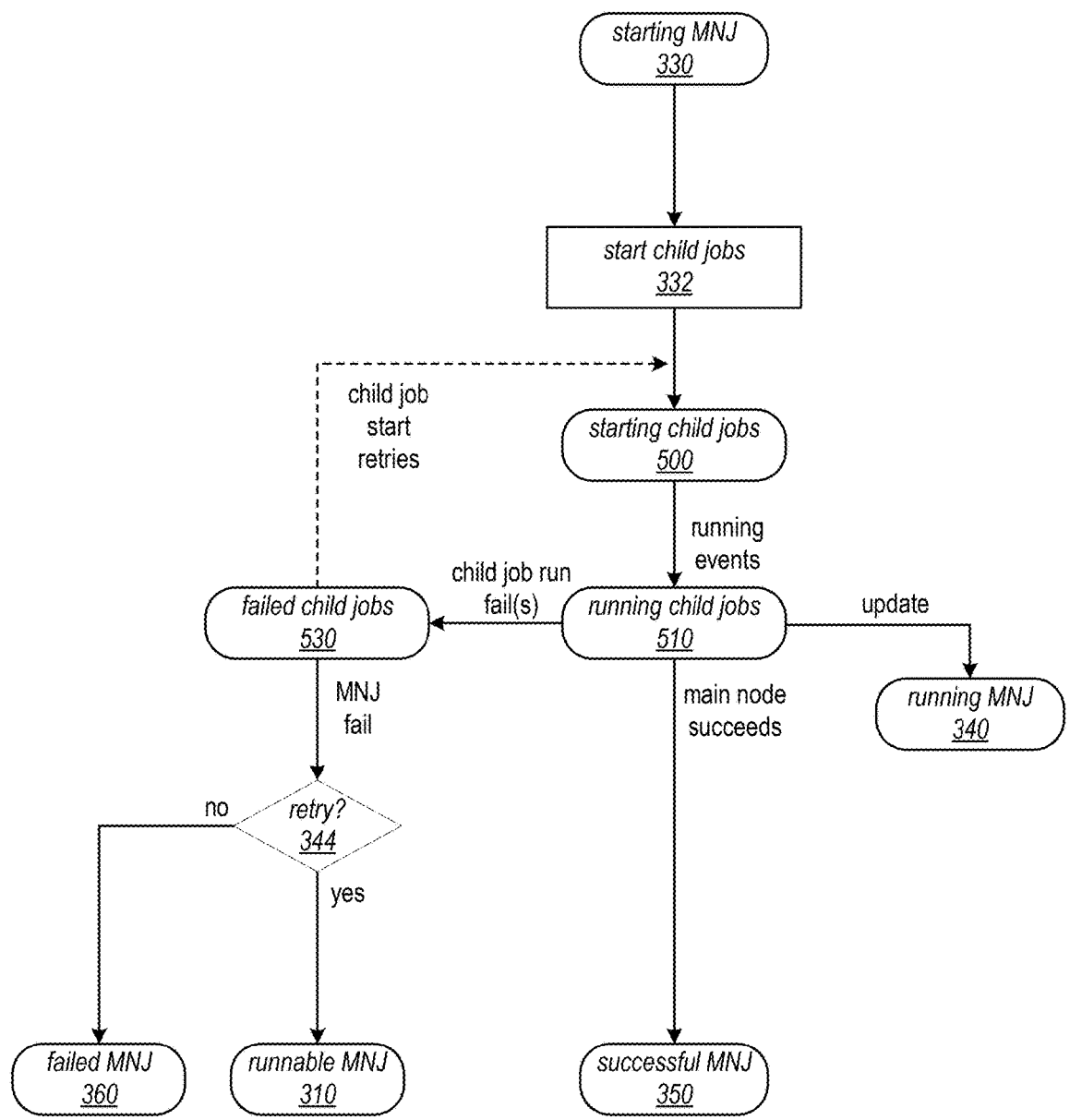
FIG. 5 shows the state transitions of child jobs when starting and running an MNJ, according to some embodiments.

FIGS. 3 through 5 illustrate the life cycle of a multi-node job in an event-driven scheduling method, and show how a multi-node job and its child jobs transition through different states, according to some embodiments.

As illustrated in FIG. 3, a multi-node job can be in one of these states:
submitted (300)
runnable (310)
starting (330)
running (340)
successful (350)
failed (360)

As illustrated in FIG. 5, a child job can be in one of these states:
starting 500
running 510
failed 530

FIG. 3 shows a high-level overview of the event-driven scheduling method, according to some embodiments. Referring to FIG. 3, a customer submits a multi-node job (MNJ), for example via an API to the batch scheduler. The MNJ is initially in a submitted state 300. The submitted MNJ 300 may be placed in a job queue 302. At 304, the batch scheduler determines when the MNJ can be run, and moves the MNJ into a runnable state 310.

At 312, resources (e.g., container instances) are assigned or allocated to the runnable MNJ 310. FIG. 4 shows the resource allocation 312 process in more detail. In resource allocation 312, a job reservation is created for the MNJ. Once all the job reservation's requirements have been met, a provisioned MNJ reservation 320 is output to a job management 322 process of the batch scheduler, and the MNJ is moved to a starting state 330. In some embodiments, as indicated by the arrow going from resource allocation 312 to failed MNJ 360, a time limit may be placed on a runnable MNJ 310. If the time limit expires before the MNJ's job reservation is provisioned, the MNJ may be moved to a failed state 360.

If resource allocation 312 is successful, at 332, the MNJ's child jobs (nodes) are started on respective container instances as indicated in the provisioned MNJ reservation 320. As previously mentioned, a main node may be started first, followed by the child nodes. Once all the child jobs have been successfully started, the MNJ is moved to a running state 340. At 342, if the child jobs succeed (i.e., if the main node succeeds), then the MNJ is moved to a successful state 350. In some embodiments, if one or more child jobs fail, then at 344, the batch scheduler determines if the MNJ can be retried. If it can be retried, the batch scheduler moves the MNJ to a runnable state 310; otherwise, the MNJ is moved to a failed state 360. For example, in some embodiments, an MNJ may be allocated one or more retry attempts, and if its allocated retry attempts are not exhausted, then the batch scheduler may retry the MNJ. FIG. 5 shows the state transitions of child jobs when starting and running an MNJ in more detail.

FIG. 4 shows the resource allocation 312 process in more detail, according to some embodiments. The batch scheduler determines when the MNJ can be run, and moves the MNJ into a runnable state 310. A namespace manager 400 executing on one or more devices of the provider network sends runnable MNJ 310 information (e.g., as a namespace report) to a master controller 402 executing on one or more devices of the provider network for scheduling and scaling. Master controller 402 returns resource (e.g., cluster) information to the namespace manager 400, which generates an MNJ reservation 406 that is provided to a job reservation manager 408 executing on one or more devices of the provider network. Master controller 402 provides the runnable MNJ 310 information to a resource provisioning 404 service executing on one or more devices of the provider network. The resource provisioning 404 service locates and provisions resources (e.g., container instances) for the MNJ reservation 406. In some embodiments, when provisioning resources (e.g., container instances) for a multi-node job, existing resources (e.g., resources that were allocated to previous jobs and that have now been freed) may be reused for the job if available. If one or more resources needed for the job are not available, the resources may be dynamically created. As resources (e.g., container instances) are provisioned, events (resource messages) are generated and sent to the job reservation manager 408, which updates the MNJ reservation 406 in response to the events. Each container instance provisioned for the job reservation by the resource provisioning 404 service is given a unique identifier; the identifiers are included in the event messages and recorded in the respective job reservation entry by the job reservation manager 408. Once all the reservations in the MNJ reservation 406 are fulfilled, the job reservation manager 408 outputs a provisioned MNJ reservation that identifies all of the container instances reserved for the MNJ.

FIG. 5 shows the state transitions of child jobs when starting and running an MNJ, according to some embodiments. Once all the job reservation's requirements have been met for the MNJ, a provisioned MNJ reservation 320 is output to a job management 322 process of the batch scheduler, and the MNJ is moved to a starting state 330. The provisioned MNJ reservation 320 indicates the container instances that have been assigned to the nodes of the MNJ. At 332, start processes are initiated for the MNJ's child jobs (nodes) on respective container instances as indicated in the provisioned MNJ reservation 320, and the child jobs are moved to the starting state 500. As previously mentioned, a node designated as a main node may be started first, followed by the child nodes. As the child jobs successfully start, running events are generated, the child jobs are moved to a running state 510, and the MNJ is moved to the running state 340. If the main node succeeds, the MNJ has been successfully completed; all of the child jobs are terminated, the job's resources (e.g., container instances) are released, and the MNJ is moved to the successful state 350.

One or more of the running child jobs 510 may fail for some reason. If a child job 510 fails, it is moved to a failed state 530. In some embodiments, for some types of failures the batch scheduler may attempt to run the failed child job again by returning the child job to the starting 500 state. In some embodiments, if at least one child job 510 fails, all of the running child jobs 510 are terminated and moved to the failed state 530. At 344, the batch scheduler determines if the MNJ can be retried. If it can be retried, the batch scheduler moves the MNJ to a runnable state 310; otherwise, the MNJ is moved to a failed state 360. For example, in some embodiments, an MNJ may be allocated one or more retry attempts, and if its allocated retry attempts are not exhausted, then the batch scheduler may retry the MNJ. Upon failure of the MNJ, the job's resources (e.g., container instances) are released.

In some embodiments, instead of the batch scheduler automatically terminating all of the child jobs and failing the MNJ upon detecting child job failure(s), the customer may be given the option (e.g., via an API) to terminate the MNJ. In some embodiments, instead of the batch scheduler automatically terminating all of the child jobs and failing the MNJ upon child job failure(s), the batch scheduler may instead wait for the main node to terminate to fail the MNJ.

Handling Failure Conditions

Embodiments of an event-driven batch scheduler may provide failure modes for handling errors in scheduling and resource allocation. A problem in allocating cloud-based resources to multi-node jobs is partial scaling, where some container instances come up and some do not. There are several stages where failures in resource allocation may occur. For example, a container instance may come up but not bootstrap. As another example, a container instance might have network or permission issues. As other examples, a container instance might have a transient error, or the container instance may fail to join the cluster.

The event-driven batch scheduler provides failure modes to deal with partial scaling, both to minimize partial scaling and, in the event that it does happen, to appropriately address the problem by taking steps to fulfill the resource requirements of the job reservation, cancelling the multi-node job, rescheduling the multi-node job, or requesting an action by the customer to address the partial scaling failure for the job; the particular actions taken may be based on be the reason for the partial scaling failure.

Scaling failure types that may be considered include, but are not limited to:

Transient launch errors that occur when provider network services attempt to launch container instances for the MNJ. Customer action is not needed to resolve these errors.

Permanent launch errors caused by customer-specific resource issues. Customer actions are required to resolve these errors. These errors include exceeding various customer resource limits (e.g., address space limits, storage limits, compute instance limits, etc.), invalid machine images (i.e., invalid our unlaunchable container images provided by the customer for the MNJ), invalid access permission, etc.

Configuration errors. The customer has incorrectly configured their underlying MNJ architecture. Examples are container images that do not have a required container agent, networking configurations that prevent container instances from communicating with provider network services such as the batch scheduler, or any other issue with the container images that prevents the batch scheduler from successfully placing jobs on them.

Handling Transient Launch Errors

In some cases, the batch scheduler may not be able to find enough resources (e.g., container instances) in the customer's compute environment to run a MNJ at the head of the customer's job queue. In some embodiments, in these cases, the batch scheduler checks to see if there are any other jobs that can be run with the available capacity in the compute environment. If there are, the batch scheduler runs those jobs. Batch scheduler continues to run jobs in the queue until there are no jobs left that can run with the available capacity in the compute environment. If there are no available resources for the remaining jobs in the queue, the jobs remain in the runnable state until the batch scheduler can provision the necessary resources. If a timeout is set in a job definition, the batch scheduler continues to attempt to scale up to run the job until the timeout has expired, at which point the job will be failed.

In some cases, the batch scheduler may fail to scale up enough container instances to run the next job, even though there are available instances in the compute environment. In some embodiments, in these cases, the batch scheduler holds existing container instances and attempts to scale up additional resources atomically. If additional resources could not be allocated within the resource allocation timeout, the compute environment will be set to invalid for the job.

In the case of irreparable failure of the underlying hardware hosting a container instance on which a particular task is executing (e.g., a host machine on the provider network), in some embodiments, the task running on that instance is failed, and the container instance is replaced (e.g., started on a different host machine). It is left up to the customer's application running the job to decide what to do in response to the failed job: e.g., exit and restart (if retries are available), fail the MNJ, etc.

Handling Permanent Launch Errors

In some cases, a customer may request a certain instance type for a MNJ, but the customer does not have a high enough instance limit to run the MNJ. The batch scheduler can detect if the customer has an instance type limit before attempting to scale the nodes for the MNJ. In this case, in some embodiments, the customer receives an error message (e.g., "instance limit reached"), for example via an API and user interface to the batch scheduler, before any instances are launched. The specified compute environment is invalidated for the job. The customer may either run the job on a different instance type, or raise the instance limit for that type. If the customer has another compute environment attached to the customer's job queue that selects different instance types, the customer's jobs may run on that compute environment.

In some cases, launched container instances may not get to a running state. Common reasons this happens is because the customer's container image is unlaunchable, or the customer has exceeded a resource limit (e.g., a storage limit). In some embodiments, the customer is informed of the particular error via an API and user interface to the batch scheduler. The customer may request a limit increase to overcome a resource limit failure. In the case of an unlaunchable container image, it is up to the customer to determine error(s) in the image that make it unlaunchable.

Handling Configuration Errors

In some embodiments, the batch scheduler does not examine container images before attempting to launch them to determine whether the container instances are valid. To prevent unutilized resources, the customer should test their container instances in a test environment or in one job before submitting a lot of batch jobs that use the container instances to insure that the container instances include the necessary components (e.g., agents, etc.) and can connect to the cluster.

In some cases, a launched container instance cannot join the cluster. In this case, the MNJ will wait for resources until resource provisioning timeout is reached, after which the compute environment is set to invalid for the MNJ. The MNJ is kept in the runnable state, and the batch scheduler may attempt to run the MNJ if there are other connected compute environments for the MNJ. If not, the MNJ will be kept in the runnable state and the other compute environments are set to invalid for the MNJ. Common reasons for this failure are that the container image does not have a properly configured container agent, or that a virtual network on the private network in which the container instance is located does not have an outbound network connection. The batch scheduler may not be able to detect the exact reason for the failure. In some embodiments, the customer receives an error message (e.g., "instance cannot join cluster"), for example via an API and user interface to the batch scheduler. It may be left to the customer to determine the exact cause of the error.

The failure modes provided by the batch scheduler may help to insure that the customers' experience of running multi-node jobs in the cloud do not result in wasted resources or time spent on not running their jobs. The batch scheduler may inform the customers that their jobs cannot be run, indicate the reasons that the jobs cannot be run, and in some cases (depending on the reasons for failure) may leave a failed multi-node job in the queue to run the job when resources become available.

Virtual Network Interfaces for Container-Based Parallel Computing Systems

Embodiments are described in which virtual network interfaces may be attached to the containers in a cluster that allow the containers to connect to and communicate with other containers in the cluster (including containers on the same host machine and containers on different host machines) directly through the network interfaces of the host machines using Internet Protocol (IP) addresses provided by the virtual network interfaces. Thus, communications between the containers in the cluster (e.g., using a messaging protocol such as the Message Passing Interface (MPI) protocol) bypass the added networking layer of the container platform and avoid latency and bandwidth restrictions that may be imposed by the container platform.

Figure 6:
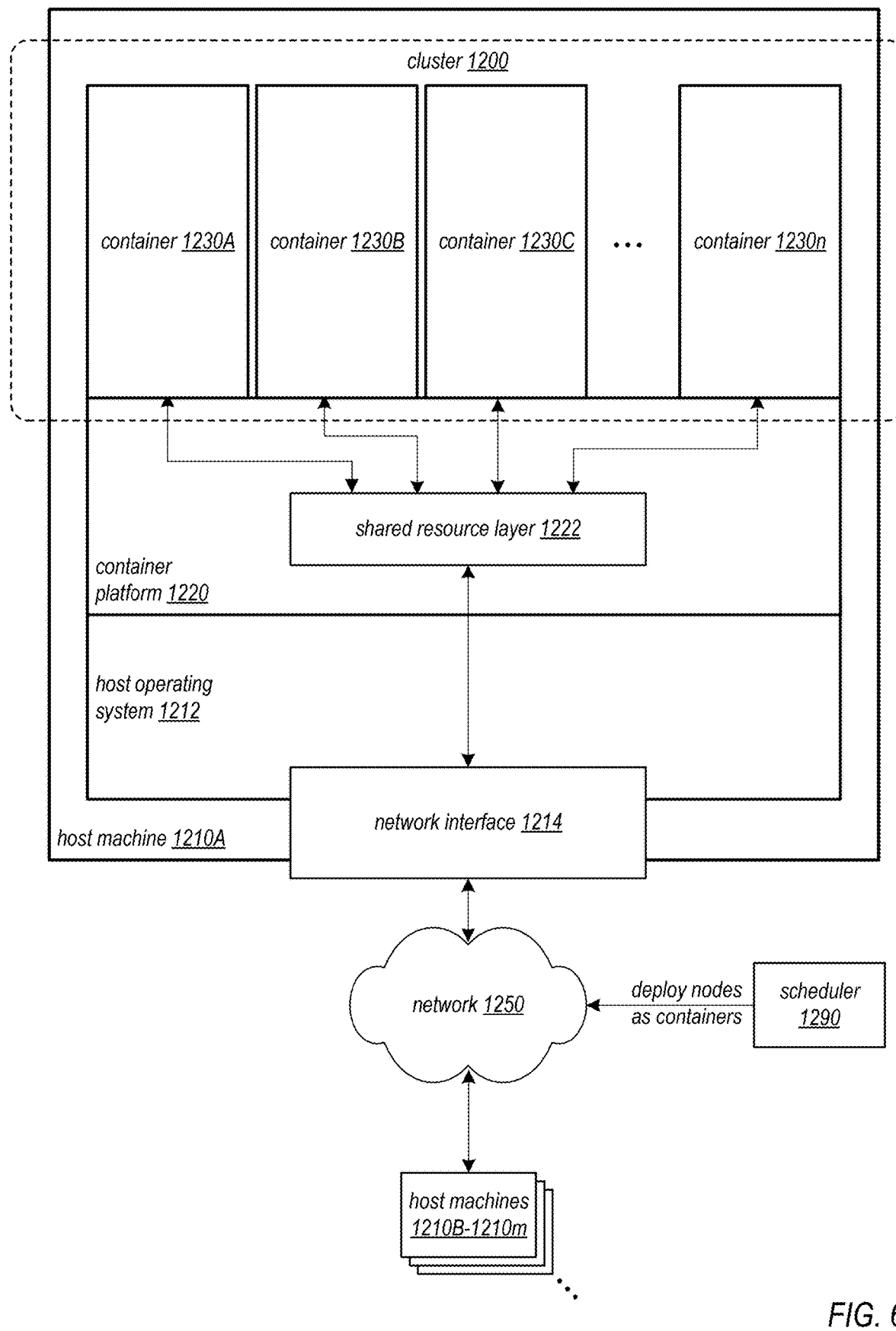
FIG. 6 illustrates nodes in a cluster implemented as containers in a container-based virtualization environment, according to some embodiments.

FIG. 6 illustrates nodes in a cluster implemented as containers in a container-based virtualization environment, according to some embodiments. A host machine 1210A on a network 1250 may execute an operating system (OS) 1212, for example a Microsoft Windows® or Linux® OS. The host machine 1210A may be a physical machine, for example a host device on the network 1250, or alternatively may be a virtual machine (VM) executing in a virtualization environment on a host device on the network 1250. The network 1250 may, for example, be a provider network as illustrated in FIGS. 10 through 13.

A container platform 1220, for example a Docker container platform, may execute on top of the host OS 1212. The container platform 1220 virtualizes the OS 1212 in order for one or more containers 1230A-1230n to run on the single OS 1212 instance. The host machine 1210 and OS 1212 may include one or more hardware and/or software resources (e.g., network interface 1214 resources such as one or more network interface cards (NICs), processor resources, memory, storage, etc.) that are shared by the container(s) 1230A-1230n executing in the container-based virtualization environment provided by the container platform 1220. By default, a container 1230 has no resource constraints and can use as much of a given resource as the host OS 1212 will allow. Thus, the container platform 1220 may enforce resource constraints on the containers 1230A-1230n, for example via a shared resource layer 1222 that orchestrates and arbitrates access to the host machine 1210/OS 1212 resources by the containers 1230A-1230n. For example, on a Linux OS 1212, the shared resource layer 1222 of container platform 1220 may use Linux namespaces and cgroups to enforce resource constraints on containers 1230A-1230n.

A user may submit an HPC application to a scheduler 1290 to be executed in a network 1250 environment (e.g., a provider network). Scheduler 1290 may, for example, be implemented as service on one or more computing devices coupled to network 1250 that provides an application programming interface (API) and user interface via which users may access an embodiment of the container-based parallel computing system to submit their HPC applications as container images for deployment to and execution on clusters 1200 of nodes implemented as containers 1260. An example event-driven batch scheduler that may be used as scheduler 1290 in some embodiments is described above in reference to FIGS. 3 through 5. The user may submit the actual container image, or alternatively may provide a name, URL, or other indication of a location of the container image. The submitted application is containerized according to the container platform. Since the application is containerized and thus includes all the application resources and configuration information that it needs to execute, the user does not need to dynamically configure the nodes in the cluster for the application as in conventional cluster-based parallel computing systems.

Scheduler 1290 may obtain the container image directly from the user, or alternatively may obtain the container image from another location, for example a store of container images for different applications that are executable by the container-based parallel computing system. Scheduler 1290 may then locate one or more suitable host machines 1210 on which the cluster 1200 is to be deployed, and deploy the container image as multiple containers 1230 to the host machine(s) 1210 to be executed in the container-based virtualization environment provided by the container platform 1220 on the host machine(s) 1210.

FIG. 6 shows multiple containers 1230A-1230n on host machine 1210A in cluster 1200; however, note that cluster 1200 may include one or more other containers 1230 deployed to one or more others of host machines 1210B-1210m on provider network 1250. While FIG. 6 shows an implementation in which multiple containers 1230 of the cluster 1200 are on a single host machine, in some embodiments, a cluster 1200 may be implemented with one container 1230 on each of two or more host machines. Once deployed, the containers 1230 in the cluster 1200 may begin parallel execution of the HPC application.

The containers 1230 in the cluster 1200 may communicate via network 1250, for example using a messaging protocol such as MPI. As previously mentioned, the HPC application may require low-latency, high-bandwidth communications between the containers 1230 on network 1250 to efficiently execute the HPC application. The container platform 1220 may provide a bridge inter-layer network for communications between containers 1230A-1230n. However, the container platform 1220 enforces resource constraints on the containers 1230A-1230n, for example via a shared resource layer 1222 that orchestrates and arbitrates access to the host machine 1210/OS 1212 resources, including the network interface 1214, by the containers 1230A-1230n. Thus, the container platform 1220 adds an extra layer for communications between the nodes (containers 1230A-1230n) in the cluster 1200 that restricts bandwidth for and adds latency to communications between the containers 1230A-1230n in the cluster 1200. To execute efficiently, high-speed HPC applications often cannot afford this additional latency and bandwidth restrictions in messaging between nodes in the cluster.

Figure 7:
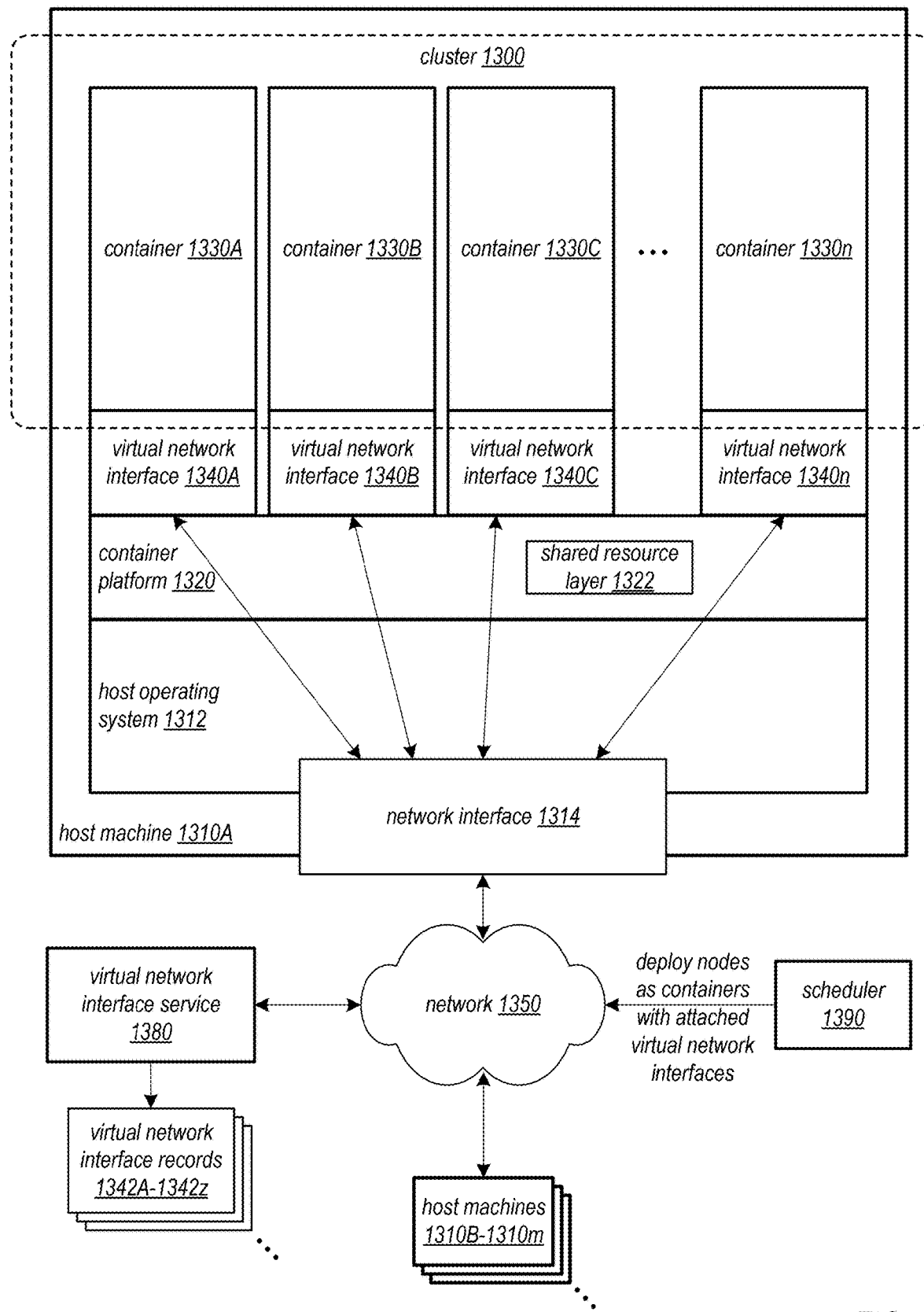
FIG. 7 illustrates attaching virtual network interfaces to containers in a cluster in a container-based virtualization environment, according to some embodiments.

FIG. 7 illustrates attaching virtual network interfaces to containers in a cluster in a container-based virtualization environment, according to some embodiments. To overcome the bandwidth and latency restrictions imposed on network communications between containers by the container platform 1320, embodiments may leverage virtual network interfaces 1340 that can be attached to containers 1330 in the container-based virtualization environment provided by the container platform 1320.

In some embodiments a virtual network interface 1340 may include a data object or record 1342 that includes, but is not limited to, information indicating one or more private and/or public IP (IPv4 and/or IPv6) addresses and subnet information (e.g., a subnet identifier that identifies a subnet to which the IP address(es) belong). A virtual network interface 1340 can be attached to a virtualized resource instance on network 1350 (e.g., a virtual machine (VM) or container 1330 executing in a virtualization environment on a physical host device on network 1350), for example by associating a virtual network interface record 1342 with the virtualized resource instance. In some embodiments, network 1350 may provide a service 1380 that maintains a repository (e.g., a list or database) of virtual network interface records 1342A-1342z and that provides an application programming interface (API) via which entities (e.g., scheduler 1390) may request virtual network interfaces 1340 to be attached to virtualized resource instances (e.g., containers 1330 in a cluster 1300) on network 1350 by assigning virtual network interface records 1342 to the virtualized resource instances.

In some embodiments, the properties (e.g., IP address(es)) of a given virtual network interface 1340 are independent of any particular NIC or NICs, and are also independent of any particular resource instance. For example, a virtual network interface 1340 can be attached to any resource instance, detached from the resource instance, and attached to a different resource instance.

Attaching a virtual network interface 1340 to a virtualized resource instance enables the resource instance to receive incoming network traffic from network 1350 directed at an IP address of the virtual network interface 1340, and enables outbound network traffic from the resource instance on to network 1350 to indicate that it originated at that IP address. The inbound and outbound network traffic of the virtualized resource instance may flow through a network interface 1314 (e.g., one or more physical network interface cards (NICs)) of a host machine 1310 on which the virtualized resource instance is executing. Network 1350 may include networking hardware, software, and data configured to route the outbound traffic from the virtual network interface 1340 IP address of the virtualized resource instance to destination IP addresses, and to route traffic from source IP addresses to the virtual network interface 1340 IP address of the virtualized resource instance. In some embodiments, the inbound traffic to and outbound traffic from the virtual network interface 1340 IP address of the virtualized resource instance may be routed over a subnet indicated by the respective virtual network interface record 1342. Note that the source IP addresses and destination IP addresses may be IP addresses associated with other virtualized resource instances on the same host machine 1310, IP addresses associated with virtualized resource instances on other host machines 1310, or IP addresses of other endpoints on the network 1350 or on a network external to the network 1350.

Attaching virtual network interfaces 1340 to the containers 1330 in a cluster 1300 enable the containers 1330 in the cluster 1300 to connect to and communicate with other containers 1330 in the cluster 1300 (including containers 1330 on the same host machine 1310 and containers 1330 on different host machines 1310) directly via the network 1350 through the network interfaces 1314 of the host machines 1310 using the IP addresses of respective virtual network interfaces 1340, thus bypassing the shared resource layer 1322 of the container platform 1320 and avoiding the latency and bandwidth restrictions imposed by the added networking layer of the container platform 1320.

The containers 1330 deployed to the cluster 1300 include all the application resources and configuration information that the particular HPC application needs to execute, and thus the user does not need to dynamically configure the nodes in the cluster for the particular HPC application as in conventional cluster-based parallel computing systems. By attaching virtual network interfaces 1340 to the containers 1330, communications between the containers 1330 in the cluster 1300 (e.g., using the MPI protocol) bypass the shared resource layer 1322 of the container platform 1320 and thus avoid the latency and bandwidth restrictions imposed by the added networking layer of the container platform 1320.

Note that, in some cluster-based HPC applications, only some of the nodes may need to communicate with other nodes in the cluster. Thus, in some cases, virtual network interfaces 1340 may be attached to only some of the containers 1330 in a cluster 1300, and not to the other containers 1330.

FIG. 7 shows multiple containers 1330A-1330n on host machine 1310A in cluster 1300; however, note that cluster 1300 may include one or more other containers 1330 deployed to one or more others of host machines 1310B-1310m on provider network 1350. While FIG. 7 shows an implementation in which multiple containers 1330 of the cluster 1300 are on a single host machine 1310, in some embodiments, a cluster 1300 may be implemented with one container 1330 on each of two or more host machines 1310. In some embodiments, in a cluster 1300 that includes containers 1330 deployed to two or more host machines 1310 on the provider network 1350, the two or more host machines 1310 may be physically located close to each other in the data center. Once deployed, the containers 1330 in the cluster 1300 may begin parallel execution of the HPC application.

Figure 8:
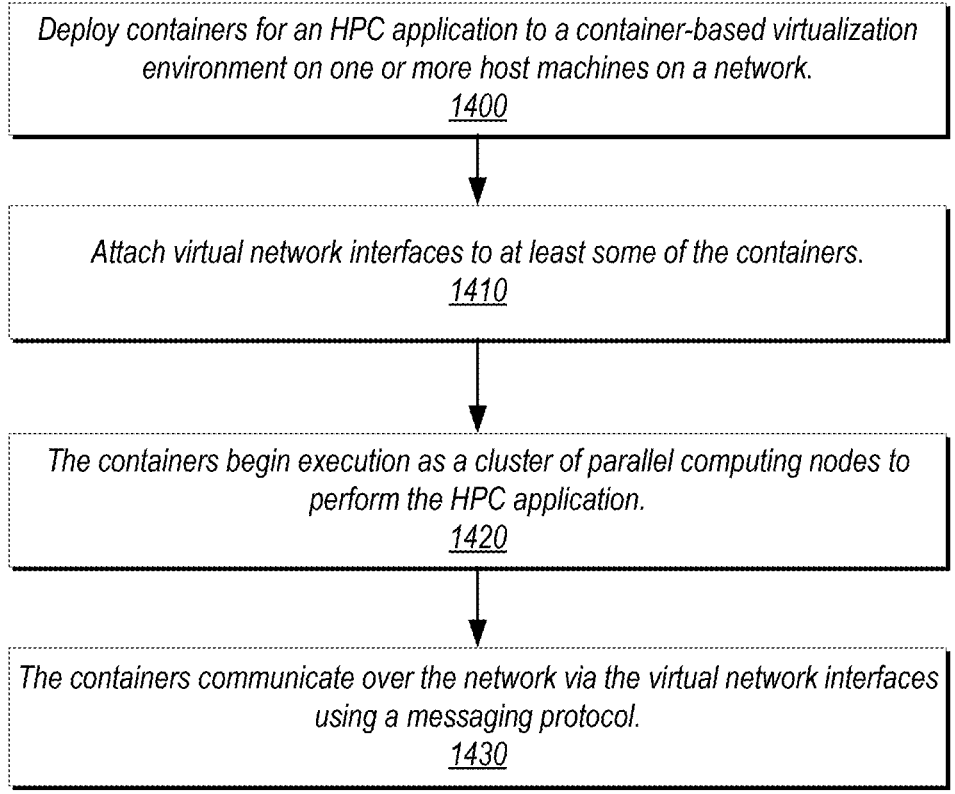
FIG. 8 is a flowchart of a method for providing low-latency, high-bandwidth networking for containerized high performance computing (HPC) applications, according to some embodiments.

FIG. 8 is a high-level flowchart of a method for providing low-latency, high-bandwidth networking for containerized high performance computing (HPC) applications, according to some embodiments. As indicated at 1400, a cluster of containers for an HPC application are deployed to a container-based virtualization environment on one or more host machines on a network. For example, a user may submit an HPC application to be run on a cluster to a scheduler (e.g., an event-driven batch scheduler as illustrated in FIGS. 3 through 5 implemented as a service in a provider network as illustrated in FIGS. 10 through 13), and the scheduler may obtain and deploy the containers that package the particular HPC application to the cluster when the HPC application is ready to run. The deployed containers include all the application resources and configuration information that the particular HPC application needs to execute, and thus the user does not need to dynamically configure the nodes in the cluster for the particular HPC application as in conventional cluster-based parallel computing systems.

As indicated at 1410, virtual network interfaces are attached to at least some of the containers. In some embodiments a virtual network interface may include a data object or record that includes, but is not limited to, one or more private and/or public IP (IPv4 and/or IPV6) addresses and subnet information (e.g., a subnet identifier). A virtual network interface can be attached to a container executing in a container-based virtualization environment on a host device on the network, for example by associating a virtual network interface record with the container, thus enabling the container to receive incoming network traffic directed at an IP address of the virtual network interface, and enabling outbound network traffic from the container to indicate that it originated at that IP address. For example, a user may submit an HPC application to be run on a cluster to a scheduler (e.g., implemented as a service in a provider network as illustrated in FIGS. 10 through 13). The scheduler obtains and deploys the containers that package the particular HPC application to the cluster when the HPC application is ready to run, and attaches virtual network interfaces to at least some of the containers in the cluster, for example by requesting virtual network interfaces for the containers in the cluster via an API to a virtual network interface service on the network. In some embodiments, the virtual network interface IP addresses assigned to the containers in the cluster are all in the same subnet.

As indicated at 1420, the containers begin execution as a cluster of parallel computing nodes to perform the HPC application. As indicated at 1430, when executing, the containers communicate over the network via the virtual network interfaces using a messaging protocol (e.g., the MPI protocol). The virtual network interface attached to a particular container in the cluster enables the particular container to receive messages from other containers in the cluster at the IP address of the virtual network interface, and to send messages to other containers in the cluster from the IP address. The inbound and outbound messages flow through a network interface (e.g., one or more physical network interface cards (NICs)) of the host machine on which the particular container is executing. The network routes the outbound messages to the IP addresses of the virtual network interfaces associated with the target containers, and routes messages from the IP addresses of the virtual network interfaces associated with other containers to the virtual network interface IP address of the particular container. In some embodiments, the virtual network interfaces assigned to the containers in the cluster are all in the same subnet, and the messages between the virtual network interface IP addresses of the containers are routed over the subnet indicated by the virtual network interface records. The communications between the containers via the virtual network interfaces thus bypass the added networking layer of the container platform and thus avoid latency and bandwidth restrictions that may be imposed by the container platform.

FIG. 9 is a flowchart of a method for processing inbound messages to and outbound messages from a container on a host machine, according to some embodiments. As indicated at 1500, outbound messages from a container executing in a container-based virtualization environment on a host machine are received at a network interface of the host machine, bypassing the networking layer of the container-based virtualization environment. The container may be one of a plurality of containers deployed in a cluster for a high-performance computing (HPC) application. The container-based virtualization environment may, for example, be a Docker container platform, and the containers may be Docker containers. The outbound messages may, for example, include Message Passing Interface (MPI) protocol messages. The network interface may, for example, include one or more NICs.

The outbound messages include an Internet Protocol (IP) address of the container on the host machine as a source IP address and IP addresses of other containers in the cluster as destination IP addresses. The IP addresses of the containers are provided by virtual network interfaces attached to the containers; each virtual network interface provides an IP address of the network for a respective container to which it is attached. The other containers in the cluster to which messages are sent and from which messages are received may include at least one container executing in the container-based virtualization environment on the same host machine, and/or at least one container executing in the container-based virtualization environment on a different host machine.

As indicated at 1510, the network interface sends the outbound messages on to the network to be routed to the destination IP addresses.

As indicated at 1520, the network interface of the host machine receives inbound messages for the container from the other containers in the cluster. The inbound messages may, for example, include Message Passing Interface (MPI) protocol messages. The inbound messages include the IP address of the container on the host machine as a destination IP address and IP addresses of the other containers in the cluster as source IP addresses.

As indicated at 1530, the network interface forwards the inbound messages to the IP address of the container on the host machine, bypassing the networking layer of the container-based virtualization environment.

Example Provider Network Environment

This section describes example provider network environments in which embodiments of the methods and apparatus described in reference to FIGS. 1A through 9 may be implemented. However, these example provider network environments are not intended to be limiting.

Figure 10:
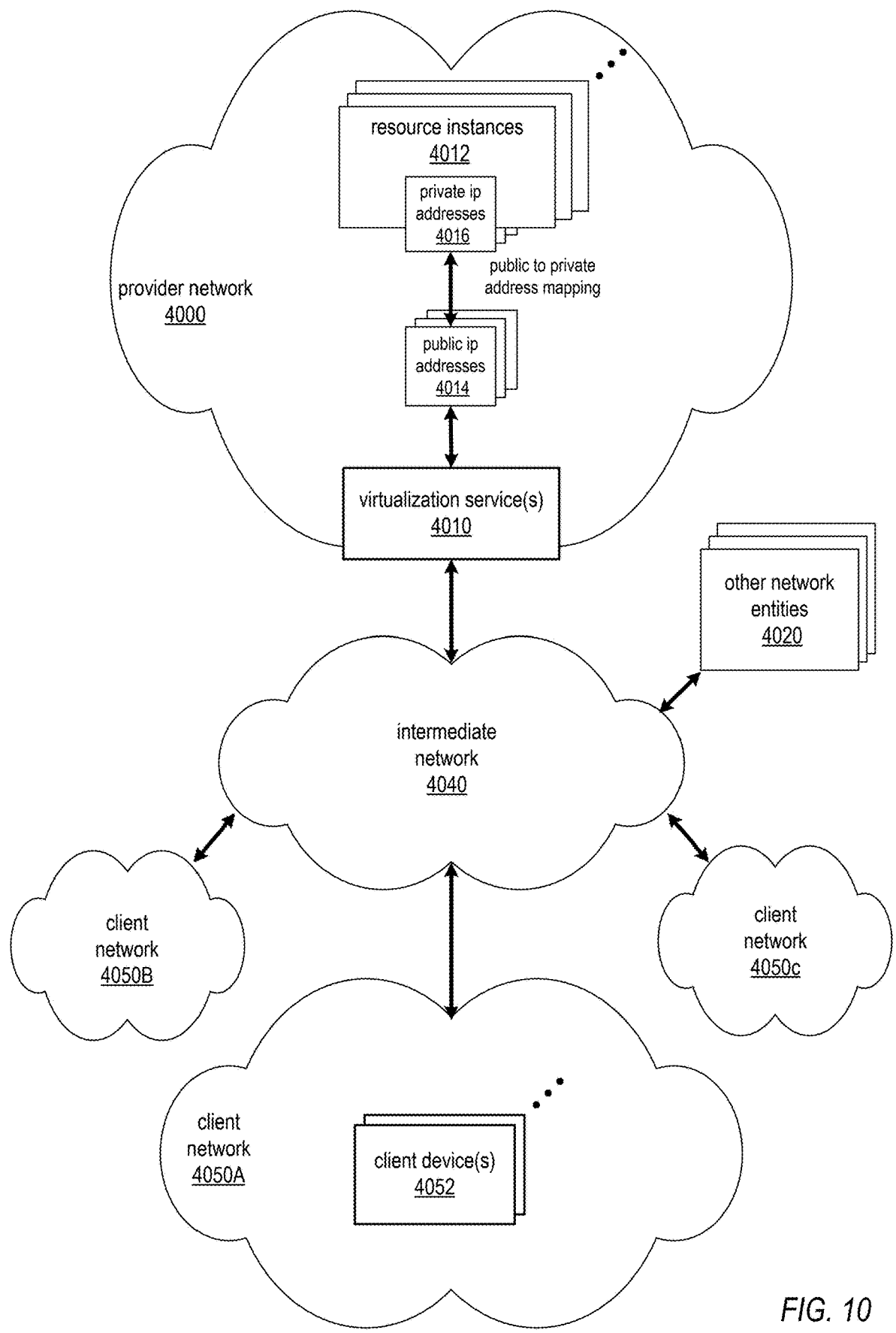
FIG. 10 illustrates an example provider network environment, according to some embodiments.

FIG. 10 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 11:
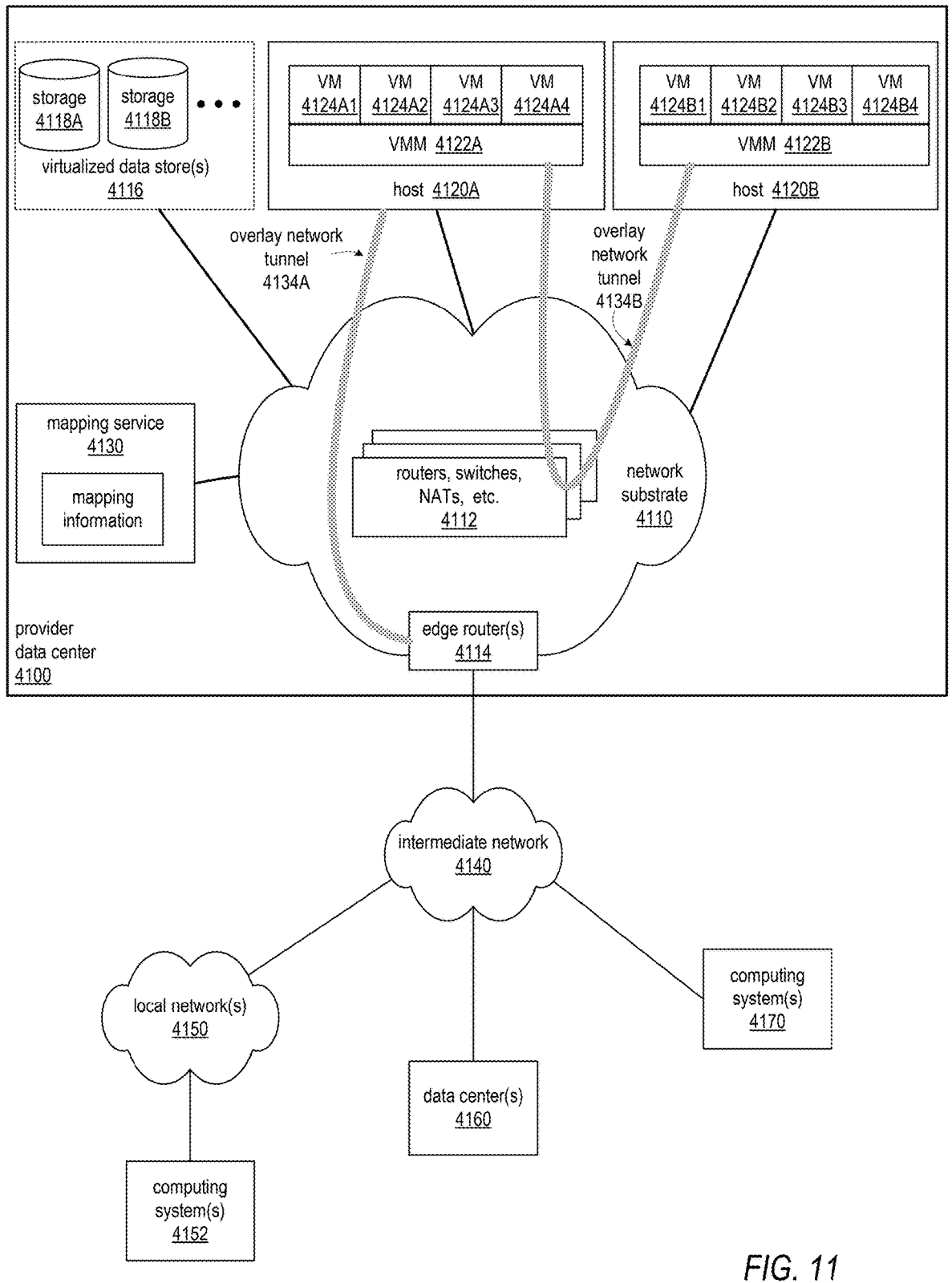
FIG. 11 illustrates an example data center that implements an overlay network on a network substrate using IP tunneling technology, according to some embodiments.

FIG. 11 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 11) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 11, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPV4 addresses may be embedded as part of 128-bit IPv6 (Internet Protocol version 6) addresses used on the substrate network as the private IP addresses.

Referring to FIG. 11, at least some networks in which embodiments may be implemented may include hardware virtualization technology that enables multiple operating systems to run concurrently on a host computer (e.g., hosts 4120A and 4120B of FIG. 11), i.e. as virtual machines (VMs) 4124 on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 11 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

In some embodiments, instead of or in addition to providing hardware virtualization technology that enables multiple operating systems to run concurrently on host computers as virtual machines (VMs) on the hosts, container technology may be leveraged to provide containers to clients of the network provider. Container technology is a virtualization technology that allows applications to be developed as containers that can be deployed to and executed in container-based virtualization environments provided by container platforms on host machines, for example on one or more hosts 4120 in a provider data center 4100. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple containers to run on a single OS instance. A primary difference between containers and VMs is that containers provide a way to virtualize an OS in order for multiple workloads to run on a single OS instance, whereas with VMs, the hardware is virtualized to run multiple OS instances.

FIG. 12 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 12, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 13:
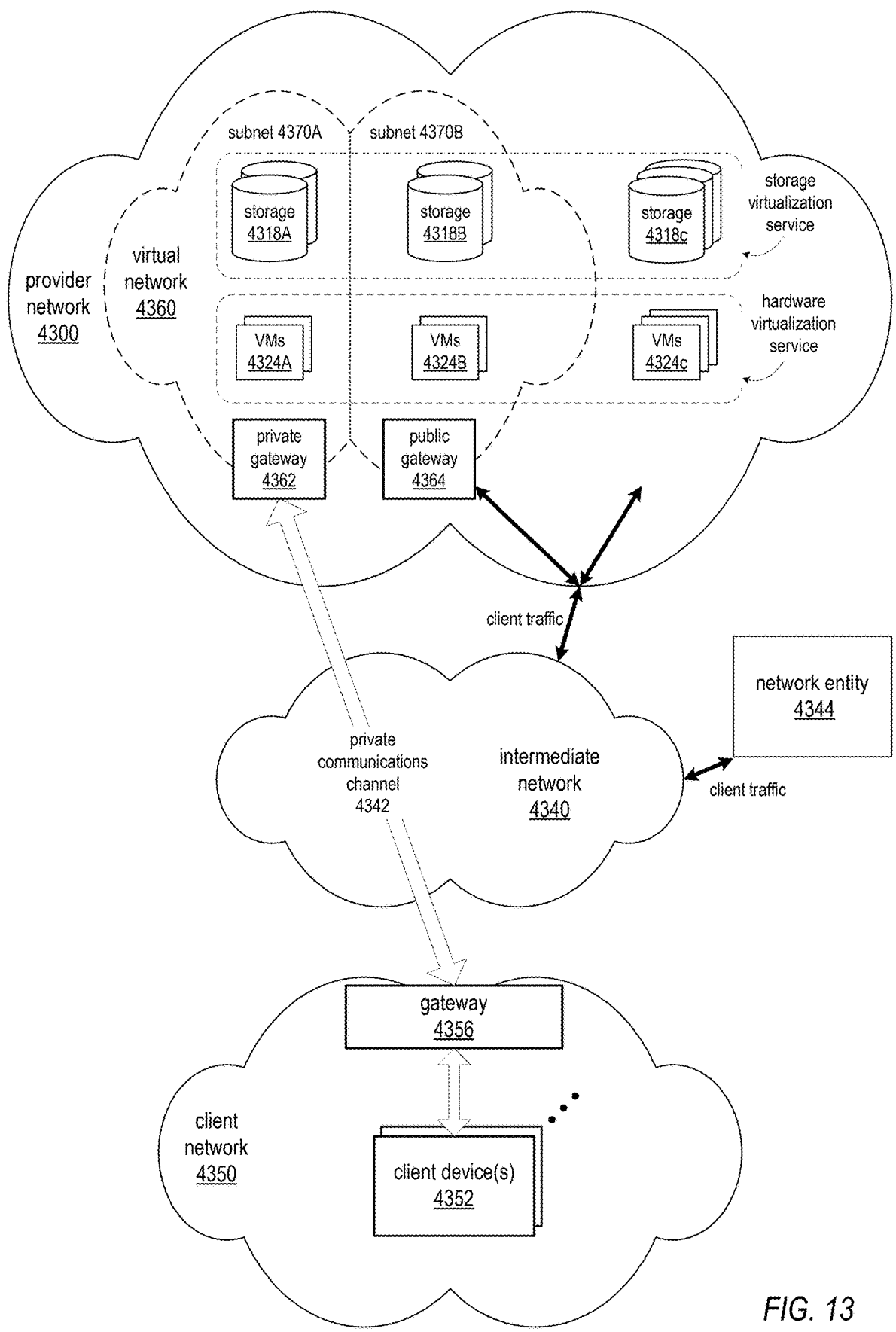
FIG. 13 illustrates an example provider network that provides virtual networks to at least some clients, according to some embodiments.

FIG. 13 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 13 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 13 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

Figure 14:
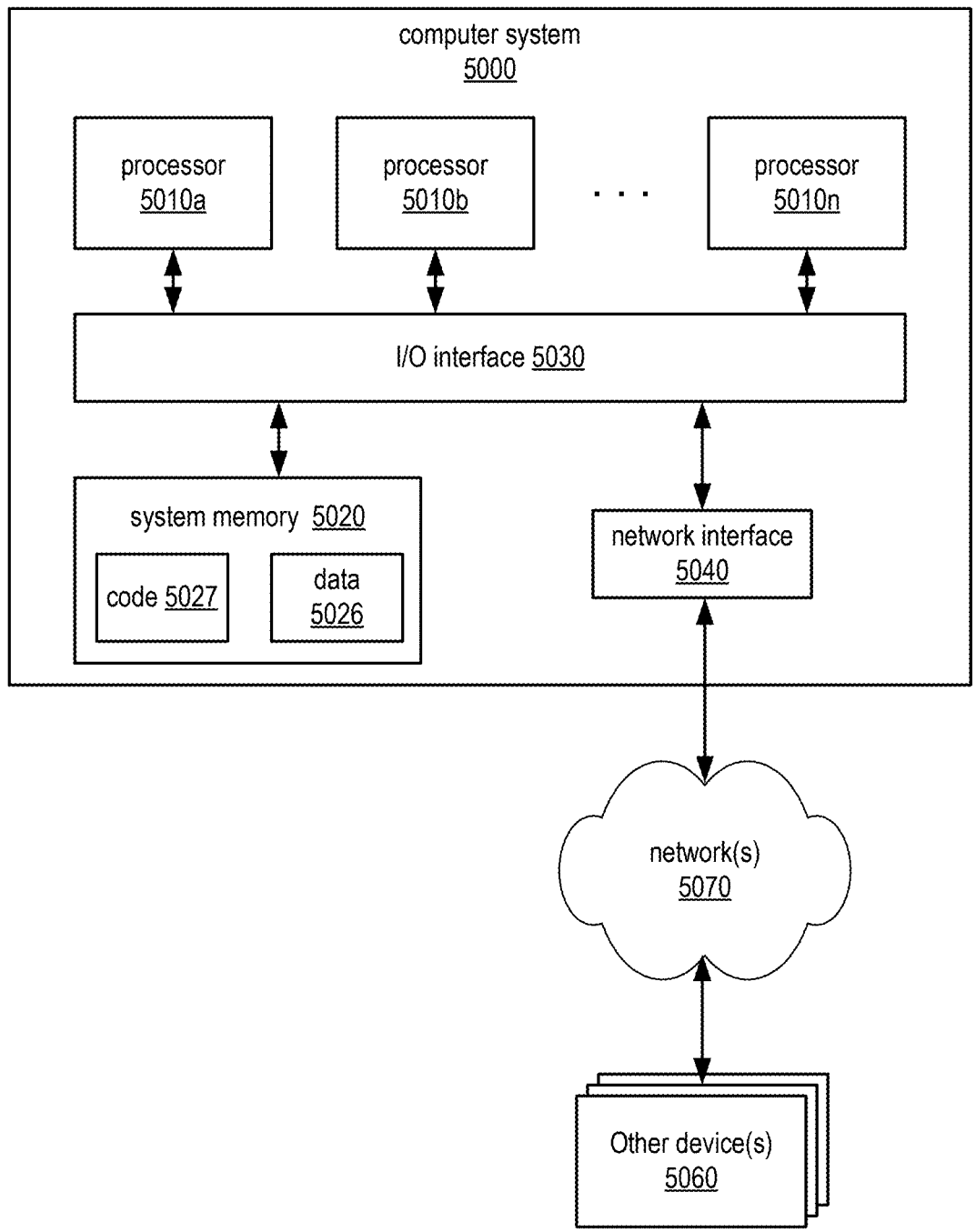
FIG. 14 is a block diagram illustrating an example computer system that may be used in some embodiments.

In some embodiments, a system that implements a portion or all of the methods and apparatus for providing a container-based parallel computing system for executing HPC applications as described herein may include a general-purpose computer system that includes or is configured to access one or more computer-accessible media, such as computer system 5000 illustrated in FIG. 14. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 14 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1A through 13, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1A through 9 for providing a container-based parallel computing system for executing HPC applications. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more processors and associated memory on a network configured to implement a scheduler service, wherein the scheduler service is configured to:
receive, via an application programming interface (API) of the scheduler service, a job specification for a multi-node job comprising a plurality of child jobs to be executed on the network, wherein the multi-node job implements a tightly coupled parallel computing application in which multiple nodes execute tasks of the tightly coupled parallel computing application in parallel and communicate over the network during execution using a parallel messaging protocol, wherein the multi-node job comprises a multi-node job state that transitions among a set of multi-node job life cycle states based at least in part on one or more child job states of child jobs that transition among a set of child job life cycle states, wherein the job specification specifies (a) an instance type of virtualized compute instances to use for the nodes and (b) a container image that includes an executable package for executing the tasks of the tightly coupled parallel computing application on an individual node;

in response to a request to run the multi-node job on the network received via the API of the scheduler service:
add the multi-node job to a job queue, wherein the multi-node job is in a submitted state when added to the job queue;
subsequent to adding the multi-node job to the job queue, transition the submitted state of the multi-node job in the job queue to a runnable state to wait for resources to be allocated to the nodes of the multi-node job;
dynamically allocate resources on the network to execute the multi-node job, including to:
generate a job reservation data structure for the multi-node job implementing the tightly coupled parallel computing application, wherein the job reservation data structure includes reservations for nodes of the multi-node job in accordance with the instance type specified in the job specification;
allocate container instances on the network to fulfill the reservations for the nodes of the multi-node job implementing the tightly coupled parallel computing application, wherein an individual container instance is launched from the container image specified in the job specification, wherein the container image is verified to include a container agent for the container instance, and wherein, upon allocating a container instance for a node, an event is generated indicating that the container instance has been assigned to the node; and
in response to each event indicating that a container instance has been assigned to a node of the multi-node job, update the job reservation data structure for the multi-node job to indicate that the respective container instance has been assigned to the respective node;
transition the runnable state of the multi-node job to a starting state and start execution of the nodes of the multi-node job on the container instances at a same time in response to determining that all of the reservations for the nodes in the job reservation data structure for performing the child jobs of the multi-node job have been fulfilled; and
transition the starting state of the multi-node job to a running state in response to determining that all of the nodes have successfully started execution on the container instances based at least in part on container agents executing on the container instances.

2. The system as recited in claim 1, wherein two or more multi-node jobs in the job queue are in the runnable state, and wherein the scheduler service is configured to prioritize allocation of container instances to a particular one of the two or more multi-node jobs that has one or more container instances already assigned to nodes of the multi-node job.

3. The system as recited in claim 1, wherein the scheduler service is configured to:
receive, via the application programming interface (API), a job specification for another multi-node job to be executed on the network;
start execution of one or more nodes of the other multi-node job on one or more container instances, said start execution comprising:
start execution of a main node of the other multi-node job; and
start execution of one or more child nodes of the other multi-node job subsequent to starting the main node;
determine that the main node has successfully completed execution or that at least one of the nodes of the other multi-node job has failed;
upon determining that the main node has successfully completed execution, transition the state of the other multi-node job to a successful state;
upon determining that at least one of the nodes of the other multi-node job has failed:
determine if the other multi-node job can be retried;
if the other multi-node job can be retried, transition the state of the other multi-node job to the runnable state; and
if the other multi-node job cannot be retried, transition the state of the other multi-node job to a failed state; and
freeing the resources that were allocated to the other multi-node job for allocation to other multi-node jobs.

4. The system as recited in claim 1, wherein the tightly coupled parallel computing application is a high-performance computing (HPC) application, and wherein the parallel messaging protocol is a Message Passing Interface (MPI) protocol for parallel computing architectures.

5. The system as recited in claim 1,
wherein the container instances are implemented in a container-based virtualization environment on one or more host machines on the network, each host machine including a network interface;
wherein virtual network interfaces are attached to the container instances, wherein each virtual network interface provides an Internet Protocol (IP) address of the network for a respective container instance to which it is attached; and
wherein, during execution of the nodes of the multi-node job, the container instances communicate according to the parallel messaging protocol over the network through the network interfaces of the one or more host machines using the IP addresses provided by the virtual network interfaces, wherein the container instances communicating over the network through the network interface on the one or more host machines using the IP addresses provided by the virtual network interfaces bypasses a networking layer of the container-based virtualization environment.

6. A method, comprising:
performing, by a scheduler service implemented by one or more devices on a network:
receiving, via an application programming interface (API) of the scheduler service, a job specification for a multi-node job comprising a plurality of child jobs to be executed on the network, wherein the multi-node job implements a tightly coupled parallel computing application in which multiple nodes execute tasks of the tightly coupled parallel computing application in parallel and communicate over the network during execution using a parallel messaging protocol, wherein the multi-node job comprises a multi-node job state that transitions among a set of multi-node job life cycle states based at least in part on one or more child job states of child jobs that transition among a set of child job life cycle states, wherein the job specification specifies (a) an instance type of virtualized compute instances to use for the nodes and (b) a container image that includes an executable package for executing the tasks of the tightly coupled parallel computing application on an individual node;

in response to a request to run the multi-node job on the network received via the API of the scheduler service:

dynamically allocating resources on the network to execute the multi-node job, wherein dynamically allocating the resources comprises:

generating a job reservation data structure for the multi-node job implementing the tightly coupled parallel computing application, wherein the job reservation data structure includes reservations for nodes of the multi-node job in accordance with the instance type specified in the job specification;

allocating container instances on the network to fulfill the reservations for the nodes of the multi-node job implementing the tightly coupled parallel computing application, wherein an individual container instance is launched from the container image specified in the job specification, wherein the container image is verified to include a container agent for the container instance, and wherein, upon allocating a container instance for a node, an event is generated indicating that the container instance has been allocated for the node; and in response to the events indicating that container instances have been allocated for the nodes of the multi-node job, updating the job reservation data structure for the multi-node job to indicate that the respective container instances have been assigned to the respective nodes; and starting execution of the nodes of the multi-node job on the container instances at a same time in response to determining that all of the reservations for the nodes in the job reservation data structure for performing the child jobs of the multi-node job have been fulfilled, based at least in part on container agents executing on the container instances.

7. The method as recited in claim 6, wherein two or more multi-node jobs are runnable, the method further comprising prioritizing allocation of the container instances to a particular one of the two or more multi-node jobs that has one or more container instances already assigned to nodes of the multi-node job.

8. The method as recited in claim 6, further comprising:
receiving, via the application programming interface (API) of the scheduler service, a job specification for another multi-node job to be executed on the network; and
starting execution of the nodes of the other multi-node job on one or more container instances, wherein starting execution of the nodes of the other multi-node job on the container instances comprises:
starting a main node of the other multi-node job; and
starting one or more child nodes of the other multi-node job subsequent to starting the main node.

9. The method as recited in claim 8, further comprising: upon determining that the main node has successfully completed execution:
generating an indication that the other multi-node job has succeeded; and
freeing one or more container instances that were allocated to the other multi-node job for allocation to nodes of other multi-node jobs.

10. The method as recited in claim 8, further comprising:
obtaining a network address of the main node upon starting the main node;
providing the network address of the main node to the child nodes when starting the child nodes; and
the child nodes sending their network addresses to the main node at the provided network address of the main node upon starting.

11. The method as recited in claim 6, further comprising, upon determining that at least one of the nodes of the multi-node job has failed:
determining if the multi-node job can be retried;
if the multi-node job can be retried, returning the multi-node job to a runnable state;
if the multi-node job cannot be retried, generating an indication that the multi-node job has failed; and
freeing the container instances that were allocated to the multi-node job for allocation to nodes of other multi-node jobs.

12. The method as recited in claim 6, wherein the parallel computing application is a high-performance computing (HPC) application.

13. The method as recited in claim 6, further comprising:
in response to the receiving a request to run the multi-node job on the network:
adding the multi-node job to a job queue in a submitted state; and
upon determining that the multi-node job is runnable, transitioning the multi-node job to a runnable state.

14. The method as recited in claim 13, further comprising:
upon determining that all of the reservations for the nodes in the job reservation data structure for the multi-node job have been fulfilled, transitioning the multi-node job to a starting state;
upon determining that all of the nodes of the multi-node job have successfully started, transitioning the multi-node job to a running state;
upon determining that a main node of the multi-node job has successfully completed execution, transitioning the multi-node job to a successful state; and
upon determining that at least one of the nodes has failed, transitioning the multi-node job to a failed state or returning the multi-node job to the running state.

15. The method as recited in claim 6,
wherein the container instances are implemented in a container-based virtualization environment on host machines on the network;
wherein virtual network interfaces are attached to the container instances, wherein each virtual network interface provides an Internet Protocol (IP) address of the network for a respective container instance to which it is attached; and
wherein the method further comprises, during execution of the nodes of the multi-node job, the container instances communicating according to the parallel messaging protocol over the network through network interfaces of the host machines using the IP addresses provided by the virtual network interfaces.

16. The method as recited in claim 15, wherein the parallel messaging protocol is a Message Passing Interface (MPI) protocol for parallel computing architectures.

17. A non-transitory computer-readable storage medium storing program instructions that when executed on a computing device cause the computing device to:
dynamically deploy a cluster of containers for executing nodes of a multi-node job to a container-based virtualization environment on one or more host machines on a network, wherein the multi-node job implements a tightly coupled parallel computing application in which the nodes execute tasks of the tightly coupled parallel computing application in parallel and communicate over the network during execution using a parallel messaging protocol, wherein the multi-node job comprises a multi-node job state that transitions among a set of multi-node job life cycle states based at least in part on one or more child job states of child jobs that transition among a set of child job life cycle states, wherein the cluster is deployed according to a job specification for the multi-node job received via an application programming interface (API) of a scheduler service, wherein the job specification specifies (a) an instance type of virtualized compute instances to use for the nodes and (b) a container image that includes an executable package for executing the tasks of the tightly coupled parallel computing application on an individual node;

wherein, to dynamically deploy the cluster of containers, the program instructions when executed on the computing device cause the computing device to:

generate a job reservation data structure for the multi-node job implementing the tightly coupled parallel computing application, wherein the job reservation data structure includes reservations for the nodes of the multi-node job in accordance with the instance type specified in the job specification;

allocate containers to fulfill the reservations for the nodes of the multi-node job implementing the tightly coupled parallel computing application, wherein an individual container is launched from the container image specified in the job specification, and wherein the container image is verified to include a container agent for a container instance;

update the job reservation data structure for the multi-node job to indicate the containers allocated to the nodes;

determine that all of the reservations for the nodes in the job reservation data structure for the multi-node job have been fulfilled; and start execution of the nodes of the multi-node job on the containers indicated in the job reservation data structure at a same time after the determination that all of the reservations for the nodes in the job reservation data structure for performing the child jobs of the multi-node job have been fulfilled, based at least in part on container agents executing on the containers.

18. The non-transitory computer-readable storage medium as recited in claim 17, wherein the program instructions when executed on the computing device cause the computing device to:

monitor execution of the nodes of the multi-node job on the containers;

upon determining that a main node of the multi-node job has successfully completed execution, generate an indication that the multi-node job is successful; and upon determining that at least one of the nodes of the multi-node job has failed, generate an indication that the multi-node job has failed or retry execution of the multi-node job; and freeing the container instances that were allocated to the multi-node job for allocation to nodes of other multi-node jobs.

19. The non-transitory computer-readable storage medium as recited in claim 17, wherein the program instructions when executed on the computing device cause the computing device to:

attach virtual network interfaces to the containers, wherein a virtual network interface provides an Internet Protocol (IP) address on the network for a respective container to which it is attached; and wherein, during execution of the nodes, the nodes communicate over the network according to the parallel messaging protocol using the IP addresses provided by the virtual network interfaces to bypass a networking layer of the container-based virtualization environment.

20. The non-transitory computer-readable storage medium as recited in claim 17, wherein deploying the cluster of containers for executing the nodes of the multi-node job is performed in response to a request to deploy a high-performance computing (HPC) application received via the API.

* * * * *